(12) United States Patent
Mitsunobu

(10) Patent No.: US 11,371,129 B2
(45) Date of Patent: Jun. 28, 2022

(54) MOLTEN ZN-BASED PLATED STEEL SHEET HAVING SUPERIOR CORROSION RESISTANCE AFTER BEING COATED

(71) Applicant: NIPPON STEEL CORPORATION, Tokyo (JP)

(72) Inventor: Takuya Mitsunobu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/755,865

(22) PCT Filed: Dec. 28, 2017

(86) PCT No.: PCT/JP2017/047173
§ 371 (c)(1),
(2) Date: Apr. 13, 2020

(87) PCT Pub. No.: WO2019/130534
PCT Pub. Date: Jul. 4, 2019

(65) Prior Publication Data
US 2021/0198780 A1    Jul. 1, 2021

(51) Int. Cl.
| | |
|---|---|
| *B32B 15/01* | (2006.01) |
| *C22C 18/04* | (2006.01) |
| *C23C 2/06* | (2006.01) |
| *C23C 2/02* | (2006.01) |
| *C23C 2/28* | (2006.01) |
| *C23C 2/40* | (2006.01) |

(52) U.S. Cl.
CPC .............. *C23C 2/06* (2013.01); *B32B 15/013* (2013.01); *C22C 18/04* (2013.01); *C23C 2/02* (2013.01); *C23C 2/28* (2013.01); *C23C 2/40* (2013.01)

(58) Field of Classification Search
CPC .............................. B32B 15/013; C22C 18/04
(Continued)

(56) References Cited

U.S. PATENT DOCUMENTS

| 6,465,114 B1 | 10/2002 | Honda et al. |
| 2009/0004400 A1 | 1/2009 | Ranjan et al. |

(Continued)

FOREIGN PATENT DOCUMENTS

| CN | 104245997 A | 12/2014 |
| EP | 2 857 544 A1 | 4/2015 |

(Continued)

OTHER PUBLICATIONS

International Search Report for PCT/JP2017/047173 (PCT/ISA/210) dated Mar. 6, 2018.
(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A hot-dip galvanized steel sheet includes a plated layer formed on at least a part of a surface of a steel sheet, the plated layer containing: Al in a range from 10 mass % to 40 mass %; Si in a range from 0.05 mass % to 4 mass %; Mg in a range from 0.5 mass % to 4 mass %; and the balance consisting of Zn and inevitable impurities. The plated layer has a lamellar structure in which a layered Zn phase and a layered Al phase are alternately arranged in a cross section of the plated layer, the lamellar structure accounting for 5% or more by an area fraction in the cross section, and a total abundance ratio of an intermetallic compound containing at least one of Fe, Mn, Ti, Sn, In, Bi, Pb or B is regulated to 3% or less by the area fraction.

7 Claims, 5 Drawing Sheets

(58) Field of Classification Search
USPC .......................................................... 428/641
See application file for complete search history.

(56) References Cited

U.S. PATENT DOCUMENTS

| | | | |
|---|---|---|---|
| 2015/0072166 A1* | 3/2015 | Nakano | C23C 28/345 |
| | | | 428/623 |
| 2015/0368778 A1 | 12/2015 | Allely et al. | |
| 2018/0245193 A1 | 8/2018 | Mitsunobu | |
| 2019/0390303 A1 | 12/2019 | Tokuda et al. | |

FOREIGN PATENT DOCUMENTS

| | | |
|---|---|---|
| EP | 3 575 433 A1 | 12/2019 |
| JP | 2001-329383 A | 11/2001 |
| JP | 2003-253416 A | 9/2003 |
| JP | 2004-323974 A | 11/2004 |
| JP | 2015-214749 A | 12/2015 |
| JP | 2016-514202 A | 5/2016 |
| TW | I236968 B | 8/2005 |
| TW | 201609369 A | 3/2016 |
| TW | 201718941 A | 6/2017 |
| WO | WO 00/71773 A1 | 11/2000 |

OTHER PUBLICATIONS

Office Action for corresponding Taiwanese Application No. 106146259 dated Aug. 6, 2018.

* cited by examiner

MOLTEN ZN-BASED PLATED STEEL SHEET HAVING SUPERIOR CORROSION RESISTANCE AFTER BEING COATED

TECHNICAL FIELD

The present invention relates to a hot-dip galvanized steel sheet having an excellent corrosion resistance after being coated.

BACKGROUND ART

In recent years, a plated steel sheet has been used for automobile components in order to prevent rust, specifically, a galvannealed steel sheet has been mainly used in the Japanese market. The galvannealed steel sheet exhibits improved weldability and corrosion resistance after being coated (hereinafter, also referred to as "post-coating corrosion resistance), which are obtained by subjecting a steel sheet to hot-dip galvanization and then alloying-heat treatment to disperse Fe into a plated layer from the steel sheet (underlying steel sheet). For instance, a plated steel sheet described in Patent Literature 1 is popularly used as a plated steel sheet for automobiles in the Japanese market.

In general, a plated steel sheet for automobiles is molded from a sheet into a complicated shape in use. Accordingly, in many cases, the plated steel sheet for automobiles is press-molded. In a case of a galvannealed steel sheet, since the plated layer becomes hard due to diffusion of Fe from the underlying steel sheet, the plated layer is easily peeled off, and there is also a peculiar problem, such as powdering and flaking, not observed in a hot-dip galvanized steel sheet in which the plated layer is soft.

In addition, in the plated steel sheet including the hard plated layer, the plated layer is liable to be damaged by an external pressure, and once cracks are generated, the cracks reach an interface between the plated layer and the underlying steel sheet, so that the plated layer is peeled off from the interface as a starting point and is liable to fall off. For instance, when the galvannealed steel sheet is used as an outer sheet of an automobile, the coating and the plated layer are peeled off at the same time by collision (chipping) of pebbles flicked by a traveling vehicle, so that the underlying steel sheet is easily exposed and is likely to be more severely corroded than a plated steel sheet including a soft and unalloyed plated layer. Further, in terms of rust prevention, since the galvannealed steel sheet contains Fe in the plated layer, when such chipping occurs, red-brown rust is easily generated by the corrosion of the plated layer to adversely affect an appearance of the automobile.

In order to solve this disadvantage, it is effective to use a plated steel sheet having a plated layer having toughness and not containing Fe in the plated layer. For instance, in North America, Europe and the like, a hot-dip galvanized steel sheet is mainly used as an automotive plated layer containing no Fe in the plated layer. The hot-dip galvanized steel sheet not subjected to the alloying treatment does not cause chipping and, since the hot-dip galvanized steel sheet does not contain Fe in the plated layer unlike the galvannealed steel sheet, red-brown rust is not generated at an early stage of corrosion. However, in a coated state, the plated layer is easily corroded under a coating film to raise (blister) the coating film, so that the hot-dip galvanized steel sheet not subjected to the alloying treatment is not suitable as the automotive steel sheet.

As a method for improving corrosion-resistance of the plating, Al is added to Zn. In a building material field, a hot-dip Al—Zn plated steel sheet has been widely put into practice. A plated layer of such a hot-dip Al—Zn plated steel sheet is formed of: a dendrite α-(Zn, Al) phase (Al primary crystal part: α-(Zn, Al) phase initially crystallized in an Al—Zn binary state diagram or the like, which is not necessarily Al-rich phase but is crystallized as a solid solution of Zn and Al): and a structure (Zn/Al mixed phase structure) formed of a Zn phase and an Al phase, the structure being formed in a gap of the dendrite Al primary crystal part. Since the Al primary crystal part is passivated and the Zn/Al mixed phase structure has a Zn concentration higher than that of the Al primary crystal part, corrosion concentrates on the Zn/Al mixed phase structure. Consequently, corrosion progresses in the Zn/Al mixed phase structure in a worm-eaten state, and a corrosion progress route becomes complicated, so that corrosion is unlikely to easily reach the underlying steel sheet. Thus, the hot-dip Al—Zn plated steel sheet has a superior corrosion resistance to that of the hot-dip galvanized steel sheet having a plated layer having the same thickness.

When such a hot-dip Al—Zn plated steel sheet is used as an automotive outer panel, the plated steel sheet is provided to automobile manufactures in a state after being plated in a continuous hot-dip plating facility, and, at the automobile manufactures, is generally machined into a shape of a panel component and subsequently subjected to automotive general coating of chemical conversion treatment, further electrodeposition coating, intermediate coating, and top coating. However, when a coating film of the outer panel using the hot-dip Al—Zn plated steel sheet is damaged, due to the unique plating phase structure of two phases of the Al primary crystal part and the Zn/Al mixed phase structure as described above, Zn is preferentially dissolved (selective corrosion of the Zn/Al mixed phase structure), starting from a scratch, at an interface between the coating film and the plated steel sheet. It has been known that the selective corrosion progresses toward a deep depth of a proper part of the coating film to cause a large blister of the coating film, and, as a result, a sufficient corrosion resistance (post-coating corrosion resistance) cannot be secured.

In order to improve corrosion resistance, addition of Mg to Al—Zn plating has been studied. For instance, Patent Literatures 2 and 3 disclose a hot-dip Zn—Al—Mg plated steel sheet having an improved corrosion resistance, in which Mg is added to a plating composition to form a Zn/Al/MgZn$_2$ ternary eutectic structure containing an Mg compound (e.g., MgZn$_2$) in a plated layer. However, a hot-dip Al—Zn plated steel sheet disclosed in Patent Literature 2 is supposed to be still formed with the Al primary crystal part having a passive film, and the problem of corrosion resistance (post-coating corrosion resistance) when the coating film is damaged after the plated steel sheet is coated is considered unsolved.

Patent Literature 4 discloses a hot-dip Al—Zn plated steel sheet having post-coating corrosion resistance that is improved by adding Bi to break passivation of the Al primary crystal part. However, the Al primary crystal part contained in the plated layer formed through a manufacturing process as defined is supposed to still have a nobler potential than that of a Zn/Al/MgZn$_2$ ternary eutectic structure around the Al primary crystal part, and the post-coating corrosion resistance is not considered to be satisfactory for the automotive plated steel sheet. Further, addition of Bi may lead to a deterioration in performance of chemical conversion treatment and an increase in production costs.

Thus, a hot-dip galvanized steel sheet having an excellent post-coating corrosion resistance and particularly being suitable for automotive applications has not been developed.

CITATION LIST

Patent Literature(s)

Patent Literature 1 JP 2003-253416 A
Patent Literature 2 International Publication No. WO 00/71773
Patent Literature 3 JP 2001-329383 A
Patent Literature 4 JP 2015-214749 A

SUMMARY OF THE INVENTION

Problem(s) to be Solved by the Invention

An object of the invention is to provide a hot-dip galvanized steel sheet excellent in post-coating corrosion resistance.

Means for Solving the Problem(s)

The inventors have investigated automotive applications of a plated steel sheet and have earnestly studied a plated layer excellent in post-coating corrosion resistance. As a result, the inventors have found that a coated film is inhibited from blistering in a coated state when a lamellar structure (hereinafter, also referred to as a "structure I"), in which a layered Zn phase and a layered Al phase are alternately arranged in the plated layer, is contained at 5% or more in total by an area fraction.

The structure I is not obtainable by a typical manufacturing method pf a hot-dip plating. The higher area fraction of the structure I in the plated layer more improves post-coating corrosion resistance of the plated layer.

From the above findings, the inventors have found it possible to provide a hot-dip galvanized steel sheet capable of inhibiting corrosion under a coated film after being coated, particularly, a hot-dip galvanized steel sheet for automobiles.

Aspect(s) of the invention will be exemplarily described as follows.

(1) According to an aspect of the invention, a hot-dip galvanized steel sheet includes: a plated layer formed on at least a part of a surface of a steel sheet, the plated layer containing: Al in a range from 10 mass % to 40 mass %; Si in a range from 0.05 mass % to 4 mass %; Mg in a range from 0.5 mass % to 4 mass %; and the balance consisting of Zn and inevitable impurities, in which the plated layer has a lamellar structure in which a layered Zn phase and a layered Al phase are alternately arranged in a cross section of the plated layer, the lamellar structure accounting for 5% or more by an area fraction in the cross section, and a total abundance ratio of an intermetallic compound containing at least one of Fe, Mn, Ti, Sn, In, Bi, Pb or B is regulated to 3% or less by the area fraction.

(2) In the above aspect, the plated layer contains Al in a range from 10 mass % to 30 mass %, Si in a range from 0.05 mass % to 2.5 mass %, and Mg in a range from 2 mass % to 4 mass %.

(3) In the above aspect, the plated layer has the lamellar structure at the area fraction in a range from 20% to 80%.

(4) In the above aspect, the plated layer has the lamellar structure at the area fraction in a range from 40% to 50%.

(5) In the above aspect, the plated layer has a Zn/Al/$MgZn_2$ ternary eutectic structure including a Zn phase, an Al phase and an $MgZn_2$ phase at the area fraction in a range from 20% to 90%.

(6) In the above aspect, an interface alloyed layer containing an Al—Fe intermetallic compound and having a thickness in a range from 100 nm to 2 µm is formed at an interface between the plated layer and the steel sheet.

Since the hot-dip galvanized steel sheet according to the above aspect of the invention is excellent in post-coating corrosion resistance and chipping resistance, a lifetime of the plated steel sheet after being coated can be prolonged, which contributes to industrial development.

BRIEF DESCRIPTION OF DRAWING(S)

DESCRIPTION OF EMBODIMENT(S)

Figure 1:
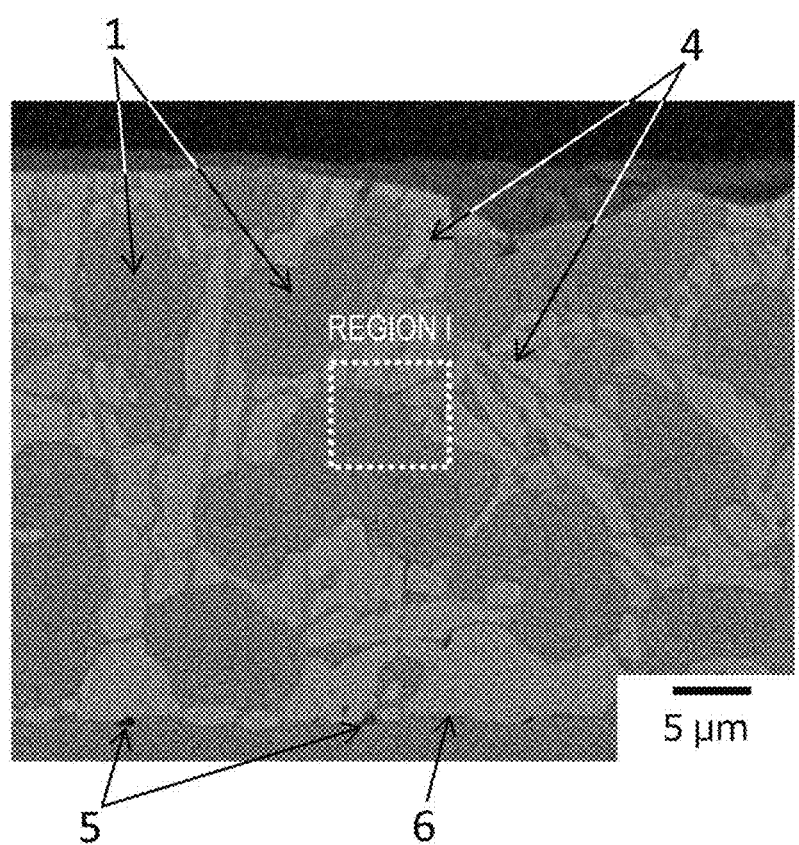
FIG. 1 shows a BSE image (Example 20), which is taken at 2000-fold magnification, of a plated layer of a Zn—Al—Mg plated steel sheet obtained by immersing a steel sheet in a plating bath and then cooling the steel sheet down in a temperature range from 275 to 180 degrees C. over 200 seconds.

A hot-dip zinc-coated steel sheet exhibiting an excellent corrosion resistance after being coated according to an exemplary embodiment of the invention will be described in detail below.

Initially, in a development field of a plated steel sheet, the expression of mass % is usually used for defining a composition of a plated layer. This rule also applies to the exemplary embodiment of the invention: % means mass % unless otherwise specified.

A hot-dip galvanized steel sheet in the exemplary embodiment of the invention includes Zn, Al, Mg and Si as essential elements of the plated layer.

Al is an essential element for improving the plated layer in terms of corrosion resistance after the plated layer being coated and chipping resistance. Although a structure I will be described in detail later, the higher a ratio of the structure I formed inside Al primary crystal is, the more improved the corrosion resistance after being coated and the chipping resistance are. Since the lowest Al concentration required for forming the structure I is 10%, the lower limit of the Al concentration is defined as 10%.

Moreover, since the formation of the structure I becomes impossible at the Al concentration exceeding 40%, the upper limit of the Al concentration is defined as 40%. In terms of the formation of the structure I, the Al concentration is preferably in a range from 10% to 30%. Further, in terms of operation, it is desirable that a melting point of the plated layer is low and a temperature of a plating bath is low. The temperature of the plating bath is preferably less than 480 degrees C., where the Al concentration is in a range from 10% to 20%. When the melting point of the plated layer is low at press working of an automobile steel sheet, metal contained in the plated layer adversely seizes on a press die. However, the plated layer with an Al composition of 10% or more, which exhibits the melting point higher than that of the hot-dip galvanized plated layer, is improved in seizure resistance. Since the melting point of the plated layer is increased as the Al composition is increased, the seizure resistance is more improved as the Al composition is increased.

Mg is also an essential element for imparting the post-coating corrosion resistance to the plated layer. When Mg is added into the plated layer, Mg is present in a form of an intermetallic compound ($MgZn_2$ and $Mg_2Si$). When Mg is present in a form of $MgZn_2$, Mg is mostly present in a form of a ternary eutectic structure represented by $Zn/Al/MgZn_2$ in the plated layer.

Such an Mg intermetallic compound elutes as an Mg ion into corrosive environments. The Mg ion coats a Zn corrosion product with an insulating film to cover rust with a barrier film, thereby blocking a corrosion factor from infiltrating into the plated layer and under the coated film, which can contribute to an improvement in corrosion resistance. Since the lowest Mg concentration required for imparting an excellent post-coating corrosion resistance to plating is 0.5%, the lower limit of the Mg concentration is defined as 0.5%. In order to obtain the more excellent post-coating corrosion resistance, the Mg concentration is preferably 2% or more. On the other hand, when the Mg concentration exceeds 4%, the formation of the structure I (described later) is inhibited to hamper the formation of the structure I accounting for 5% or more by an area fraction. Accordingly, the upper limit of the Mg concentration is defined as 4%.

Next, Si contained in the plated layer will be described. Si is an essential element of the plated layer in the exemplary embodiment. When Si is contained in a plating bath, Si inhibits a reaction between Zn and Al contained in the plating bath and Fe element in a steel substrate for plating (steel substrate). In other words, Si, which controls the reaction between the plated layer and the steel substrate, is an element essential for controlling a behavior of forming an interface alloyed layer (particularly, an Al—Zn—Fe compound) formed of an Al—Fe intermetallic compound to influence adhesion and workability of the plated layer.

The lowest concentration of the added Si required for inhibiting the formation of the interface alloyed layer is 0.05%. At less than 0.05%, the interface alloyed layer grows immediately after the steel substrate is immersed, thereby making it impossible to provide ductility to the plated layer. Further, alloying of the steel substrate and the plated layer forms an Fe—Zn intermetallic compound and an Al—Fe intermetallic compound in the plated layer to hamper a sufficient formation of the structure I, which causes deterioration of workability and corrosion resistance. On the other hand, at the Si concentration exceeding 4%, an Si phase, which is noble in potential, remains in the plated layer and adversely serves as a cathode in corrosion, resulting in deterioration of the post-coating corrosion resistance. Accordingly, the upper limit of the Si concentration is defined as 4%. Moreover, an excessive formation of the Si phase deteriorates chipping resistance and seizure resistance. In order to secure an excellent post-coating corrosion resistance, the Si concentration is preferably 2.5% or less.

In addition to Al, Mg and Si, Zn is also an essential element for the plated layer in the exemplary embodiment. Further, inevitable impurities such as Fe, Mn, and Ti, which are dispersed into the plated layer from the steel sheet, and inevitable impurities such as Sn, In, Bi, Pb, and B, which are inevitably mixed during manufacturing of the plating bath, are sometimes contained in the plated layer in a form of an intermetallic compound containing at least one element of Fe, Mn, Ti, Sn, In, Bi, Pb or B (hereinafter, also referred to as "other intermetallic compounds" in order to differentiate this intermetallic compound from the intermetallic compound generated at the interface alloyed layer). Zn needs to be contained at a predetermined concentration or more in the plated layer in order to secure sacrificial protection and corrosion resistance of the plated layer and suitability for preliminary coating on a plated steel sheet for automobiles. Al and Zn need to account for most of the composition of the plated layer.

When the plated layer are formed of the above elements, the plated layer has a structure substantially formed of a Zn phase and an Al phase, and has a thickness ranging from about 3 μm to 50 μm.

Next, the structure of the plated layer will be described.

An exemplary plated structure of the plated layer in the exemplary embodiment is shown in FIG. 1. The plated layer in the exemplary embodiment mainly has (1) to (4) structures as follows:

(1) a lamellar structure (denoted by a numeral 2 in FIG. 2 and also referred to as "structure I" hereinafter) in which a layered Zn phase and a layered Al phase are alternately arranged;

(2) a structure (denoted by a numeral 3 in FIG. 2 and also referred to as "structure II" hereinafter) formed of a granular Zn phase and a granular Al phase generated to cover the structure I;

(3) $Zn/Al/MgZn_2$ ternary eutectic structure (denoted by a numeral 4 in FIG. 1 and also referred to as "eutectic structure" hereinafter) formed by Zn—Al—Mg ternary eutectic reaction; and (4) $Mg_2Si$ phase (denoted by a numeral 5 in FIG. 1).

An interface alloyed layer (5) (denoted by a numeral 6 in FIG. 1) formed of an Al—Fe intermetallic compound is formed at an interface between the plated layer and the steel substrate.

Figure 3:
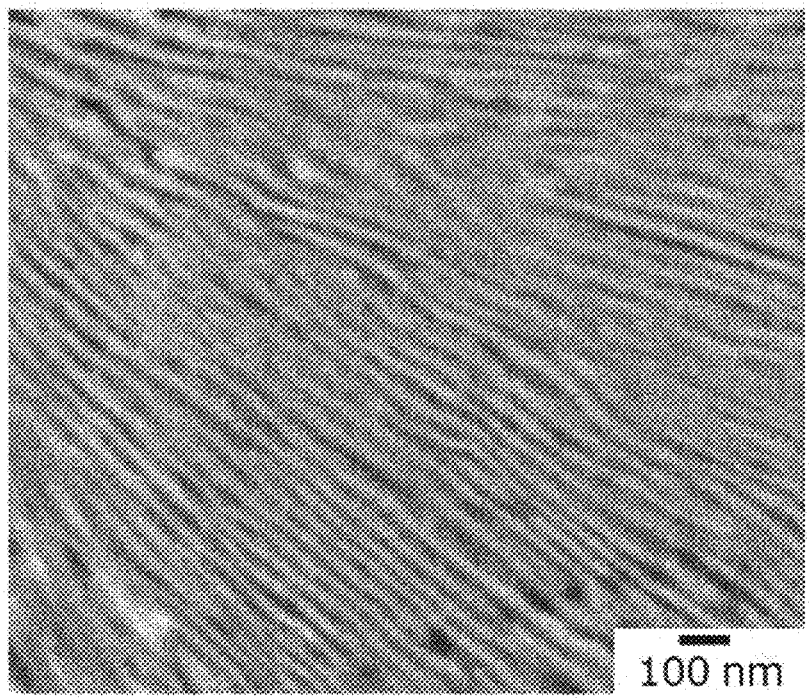
FIG. 3 shows a BSE image (Example 20) of the structure I in FIG. 2, taken at 30000-fold magnification.

Each of the layered Zn phase and the layered Al phase in the structure I may be generally in a form of a layer having an aspect ratio (a ratio of a short side to a long side of a crystal grain size: short side/long side) being 0.1 or less, though not particularly limited. Moreover, a thickness of each of the layered Zn phase and the layered Al phase may be generally in a range from about 20 nm to about 500 nm, particularly in a range from about 20 nm to about 100 nm, though not particularly limited. Accordingly, in the structure I, a stripe pattern having a repeating unit of about 40 nm to about 1000 nm, in which the repeating unit is formed of the layered Zn phase and the layered Al phase, is formed as shown in FIG. 3.

The granular Zn phase in the structure II may be generally in a form of a grain having an aspect ratio (short side/long side) being in a range from more than 0.1 to 1 and may have a grain size in a range from 80 nm to 800 nm, though not particularly limited. Similarly, the granular Al phase in the structure II may be generally in a form of a grain having an aspect ratio (short side/long side) being in a range from more than 0.1 to 1 and may have a grain size in a range from 80 nm to 700 nm, though not particularly limited.

Here, a process of forming the structure in the plated layer will be described. In a process of cooling from a bath temperature, initially, Al primary crystal (α-(Zn, Al) phase crystallized as primary crystal) is crystallized to grow in a form of dendrite. At this time, since solidification of the plated layer progresses in a state of non-equilibrium due to a high cooling rate, the solidification progresses at an average Al concentration, which is higher than that shown in an equilibrium diagram, in the Al primary crystal. When the plated layer is further cooled and the temperature is lowered to an eutectic temperature, a liquid phase present in an exterior of the Al primary crystal causes $Zn/Al/MgZn_2$ ternary eutectic reaction or Zn/Al binary eutectic reaction, thereby completing the solidification. When the plated layer is further cooled and the temperature is lowered to an eutectoid temperature (275 degrees C.) or less, solid phase transformation occurs inside the Al primary crystal (α-(Zn, Al) phase), so that a double-phase structure consisting of the Zn phase and the Al phase is present inside the Al primary crystal. According to the exemplary embodiment of the invention, the structure I is formed inside the Al primary crystal by controlling the solid phase transformation.

According to a later-described method of manufacturing the hot-dip galvanized steel sheet in the exemplary embodiment of the invention, the structure I that is not obtainable by a typical manufacturing method of a hot-dip galvanized steel sheet is obtained. The structure I, which refers to a lamellar structure in which the layered Zn phase and the layered Al phase are alternately arranged, is formed inside the Al primary crystal (denoted by the numeral 1 in FIG. 1). An average composition of the entire structure I generally includes the Al concentration in a range from 15 mass % to 55 mass % and the rest being Zn and inevitable impurities of less than about 2 mass %, though not particularly limited.

Although described in detail later, the structure I is a structure formed by a co-precipitation reaction occurring in a temperature range from 180 to 275 degrees C. Only when the plated layer is cooled at an average cooling rate ranging from 0.095 to 1.9 degrees C. per second in the temperature range from 180 to 275 degrees C., the area fraction of the structure I in a cross section of the plated layer becomes 5% or more. Since the cooling rate of the cooling conditions described herein is lower than that in a typical process, it is considered that diffusion of Zn atoms and Al atoms progresses during a co-precipitation reaction, resulting in the formation of the structure I. On the other hand, in the typical process, since the cooling rate is as high as 10 degrees C. per second, diffusion of Zn atoms and Al atoms does not sufficiently progress, resulting in no formation of the structure I. The cooling conditions described herein are difficult in implementation in a current manufacturing line such as a continuous galvanizing line, resulting in no formation of the structure I so far. In the structure I, since a lamellar space is as small as 40 nm to 1000 nm, a ratio of a heterogeneous interface between the Zn phase and the Al phase in the structure is extremely high, so that characteristics of the heterogeneous interface between the Zn phase and the Al phase are dominant as compared with characteristics of the Al phase contained in the structure. Since the heterogeneous interface between the Zn phase and the Al phase is liable to be corroded under corrosion environments due to a high interfacial energy. As a result, the entire structure I is corrodible under corrosion environments.

Accordingly, the inclusion of the structure I inhibits a selective corrosion of the structure except for the Al primary crystal, the selection corrosion occurring in typical hot-dip Al—Zn plating and hot-dip Zn—Al—Mg plating, thereby improving a post-coating corrosion resistance. Further, since the structure I is mainly formed of the Zn phase and the Al phase which are capable of plastic deformation, the structure I is excellent in ductility, and as a result, contributes to improvement in chipping resistance. The effect of improving the post-coating corrosion resistance and the chipping resistance by the structure I is increased as the area fraction of the structure I included in the plated layer is increased.

When a total value of the area fraction of the structure I is less than 5%, the improvement effect of the post-coating corrosion resistance cannot be obtained. Therefore, the lower limit is set to 5%. On the other hand, as described above, as the area fraction of the structure I is increased, the improvement effect of the post-coating corrosion resistance and the chipping resistance is increased. Accordingly, the upper limit may be 100%, and is generally 90% or 80%. According to the method of manufacturing the hot-dip galvanized steel sheet in the exemplary embodiment, the area fraction of the structure I of about 50% or more can be reliably achieved. In order to improve both the post-coating corrosion resistance and the chipping resistance, and further improve seizure resistance reliably and remarkably, the area fraction of the structure I is preferably 15% or more, more preferably 20% or more, most preferably 40% or more.

The "area fraction" of the invention refers to an arithmetic mean value obtained by calculating an area fraction of a desired structure in a cross section of a plated layer for five or more different samples selected randomly unless otherwise specified. The area fraction substantially represents a volume fraction in the plated layer.

Figure 5:
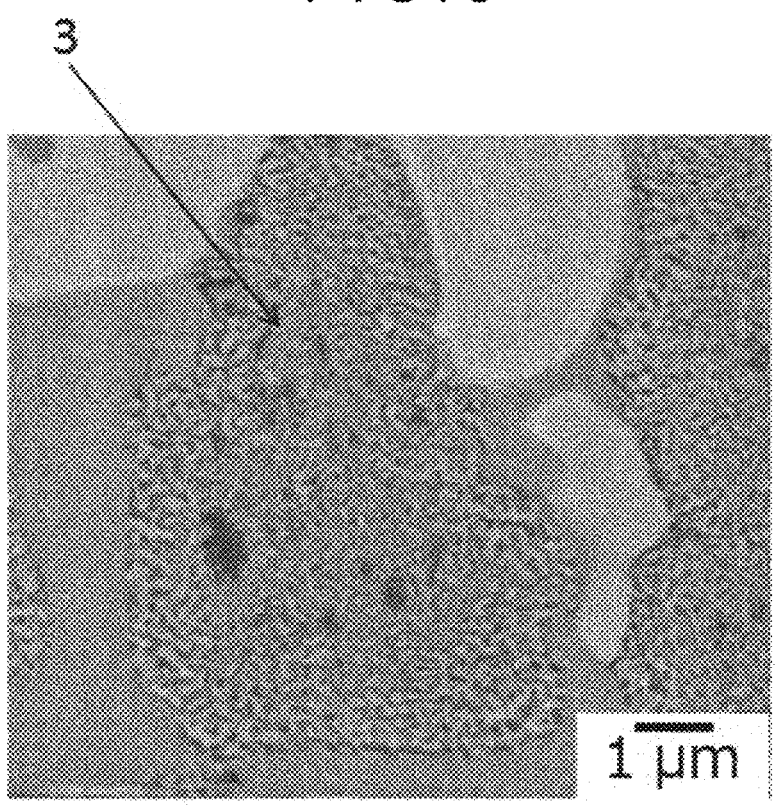
FIG. 5 shows a BSE image (Comparative 19) of a region II in FIG. 4, taken at 10000-fold magnification.

The structure II is a structure formed of a granular Al phase and a granular Zn phase. In general, the Al concentration is in a range from 20 to 55 mass % and the Zn concentration is in a range from 45 to 80 mass % in the structure II. Although the details are described later, the structure II is a structure formable by a co-precipitation reaction when cooled in a temperature range from 180 to 275 degrees C. The structure II has a structure in a granular form of the Zn phase and the Al phase, which is different from the structure I and is in the same type as the structure formed in a typical plating process (denoted by a numeral 3 in FIG. 5). The structure II has a low area fraction of a heterogeneous interface between the Zn phase and the Al phase in the structure, and is entirely formed with a passivation film. As a result, the structure II has a noble potential due to the passivation film, promotes corrosion of the surrounding structure, and deteriorates the post-coating corrosion resistance. Accordingly, in order to reliably obtain the post-coating corrosion resistance, the area fraction of the structure II is preferably low. The examination of the manufacturing process reveals that generation of the structure II can be completely inhibited. Accordingly, the lower limit of the area fraction of the structure II is set to 0%. On the other hand, when the area fraction of the structure II is 40% or more, the post-coating corrosion resistance is deteriorated irrespective of any structure control. Accordingly, the upper limit is set to 40%. In order to impart an excellent post-coating corrosion resistance to the plated layer, the area fraction of the structure II is preferably less than 30%, more preferably less than 20%.

Since the structure II is mainly formed of the Zn phase and the Al phase which are capable of plastic deformation in the same manner as the structure I, the structure II is excellent in ductility and can contribute to improvement in the chipping resistance. When the total area fraction of the structure I and the structure II is less than 10%, the effect of improving the chipping resistance is hardly obtained, and therefore, the lower limit of the total area fraction of the structure I and the structure II is preferably 10%. Moreover, even when the area fraction of the structure I is 10% or more, the chipping resistance is superior to that of a typical hot-dip galvanizing and galvannealing. Although details are described later, each area fraction of the structure I and the structure II in the plated layer can be obtained by utilizing image processing from a reflected electron image (BSE image) of SEM.

A Zn/Al/MgZn$_2$ ternary eutectic structure is a layered structure of a Zn layer, an Al layer and an MgZn$_2$ layer, the layered structure being formed of a Zn phase, an Al phase and an MgZn$_2$ phase finally solidified outside the Al primary crystal part by Zn—Al—Mg eutectic reaction at 335 degrees C. The Zn/Al/MgZn$_2$ ternary eutectic structure contributes to improvement in the post-coating corrosion resistance. The improvement in the post-coating corrosion resistance is attributable to the insulation coating of a corrosion product produced by corrosion of the plated layer by Mg contained in the structure. Since the post-coating corrosion resistance is further improvable by setting the area fraction of the Zn/Al/MgZn$_2$ ternary eutectic structure to 20% or more, the lower limit is preferably 20%. However, since the Zn/Al/MgZn$_2$ ternary eutectic structure contains MgZn$_2$, which is an intermetallic compound phase having poor toughness, ductility of the Zn/Al/MgZn$_2$ ternary eutectic structure is inferior to that of the structure I and the structure II. When the area fraction of the Zn/Al/MgZn$_2$ ternary eutectic structure, which is inferior in the ductility, in the plated layer exceeds 90%, the chipping resistance is lowered. Accordingly, the upper limit is preferably 90%. When the concentration of Mg contained in the plated layer is low, a Zn/Al binary eutectic structure is sometimes formed in the plated layer in addition to the Zn/Al/MgZn$_2$ ternary eutectic structure. The Zn/Al binary eutectic structure is formed of the Zn phase and the Al phase formed by a Zn/Al binary eutectic reaction after the Al primary crystal part is crystalized. This structure contains Al at a low concentration of about 3 to 6% in average in the structure and does not contain the MgZn$_2$ phase because Zn-5% Al is solidified by the eutectic composition, so that the effect of improving the corrosion resistance is lower than that of the Zn/Al/MgZn$_2$ ternary eutectic structure. Accordingly, the area fraction of the Zn/Al binary eutectic structure is preferably low in terms of the post-coating corrosion resistance.

As a result of examining the post-coating corrosion resistance and the chipping resistance of the plated layer, the inventors have found that the structure I contributes to improvement in both the post-coating corrosion resistance and the chipping resistance.

In a plated steel sheet for automotive applications, a period from occurrence of a car scratch to blistering of a coated film and generation of red rust is important. In the structure of the plated layer, the post-coating corrosion resistance of the plated layer is more improved as the area fraction of the structure I is higher. For instance, when the area fraction of the structure I is 5% or more, it has been found that the post-coating corrosion resistance is superior to that of a commercially available hot-dip galvanized steel sheet. This is because the structure I according to the exemplary embodiment of the invention contributes to the improvement in the post-coating corrosion resistance. When the area fraction of the structure I in the plated layer is 20% or more and the area fraction of the structure II is less than 20%, the post-coating corrosion resistance is more improved. When the total value of the area fraction of the structure I in the plated layer is 40% or more and the area fraction of the structure II is less than 10%, the post-coating corrosion resistance is further improved. In the exemplary embodiment, since the structure II does not give a favorable influence to the post-coating corrosion resistance, the area fraction of the structure II is preferably as low as possible.

Further, as a result of examining the chipping resistance, it has been found that, when the structure I contained in the plated layer is 5% or more, the chipping resistance is also improved. When Mg is contained in a Zn plated layer, an intermetallic compound having a poor workability such as MgZn$_2$ or Mg$_2$Si is likely to be formed. When the content of Mg in the Zn plated layer is 4 mass % or less, the generated MgZn$_2$ or Mg$_2$Si does not inhibit the chipping resistance. An Al—Fe intermetallic compound is formed as an interface alloyed layer at an interface between the steel substrate and the plated layer. The interface alloyed layer preferably has a thickness of 100 nm or more in order to reliably obtain adhesion between the steel substrate and the plated layer. However, since the interface alloyed layer is a brittle intermetallic compound, the chipping resistance is lowered when the thickness exceeds 2 µm. When a large amount of the intermetallic compound exists, toughness of the plated layer is lowered and consequently the chipping resistance is lowered.

Next, a characteristic manufacturing method of the hot-dip galvanized steel sheet in the exemplary embodiment will be described.

A material of the steel sheet as a base material of the hot-dip galvanized steel sheet in the exemplary embodiment may be exemplified by an Al-killed steel, ultra-low carbon steel, high-carbon steel, various high-tension steels, Ni-containing steel, and Cr-containing steel, though not particularly limited. A steel manufacturing method, steel strength, and pretreatment of a steel material such as hot rolling, pickling and cold rolling are not particularly limited.

Contents of C, Si and the like of the steel material are also not particularly limited. It is not confirmed that elements such as Ni, Mn, Cr, Mo, Ti and B and so on added to the steel material affect the Zn plated layer in the exemplary embodiment.

A Sendzimir method, a pre-plating method and the like are applicable to the manufacturing method of the hot-dip galvanized steel sheet in the exemplary embodiment. When Ni is used as a kind of pre-plating, Ni is sometimes contained in the intermetallic compound mainly formed of Al and Fe when the plated layer is heated.

A Zn plating bath may be prepared by mixing a Zn—Al—Mg alloy and an Al—Si alloy such that each of components has a predetermined concentration and melting the mixture at the temperature ranging from 450 to 650 degrees C. When the base material whose surface is sufficiently reduced is immersed in a plating bath at the temperature ranging from 350 to 600 degrees C. and pulled up from the plating bath, a Zn plated layer can be produced on the surface of the base material. In order to control an adhesion amount of the plated layer, the plated layer is wiped by N$_2$ gas immediately after the hot-dip plating.

Figure 4:
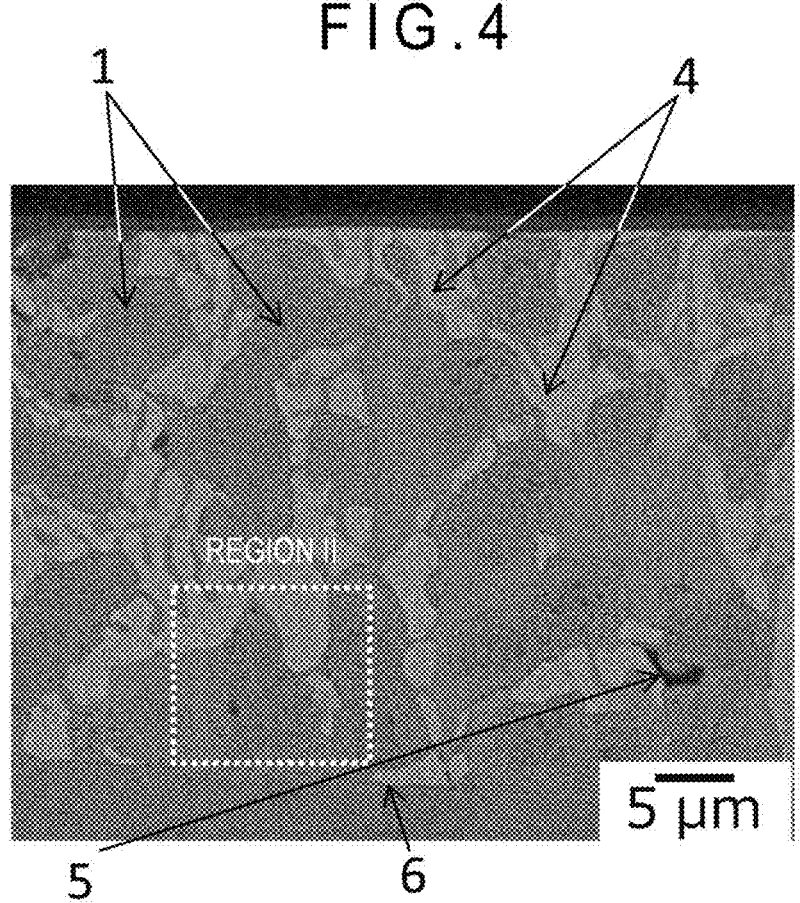
FIG. 4 shows a BSE image (Example 19) of a plated layer of a Zn plated steel sheet obtained by immersing a steel sheet in a plating bath and then cooling the steel sheet down to the room temperature at a cooling rate of 10 degrees C. per second.

When the plated layer is produced in the plating bath having the composition in the exemplary embodiment according to a typical hot-dip plating, a plated structure as disclosed in FIG. 4 is formed. Specifically, the plated layer is formed of the Zn/Al/MgZn$_2$ ternary eutectic structure and the Mg$_2$Si phase (denoted by a numeral 5 in FIG. 4). The structure I in the exemplary embodiment is not formed by natural cooling, furnace cooling, cooling at a solidification cooling rate of a typical hot-dip plating, and cooling at a cooling rate of 10 degrees per second from a melting point to a room temperature.

A method of forming the structure I will be described. The structure I is formed by satisfying the following cooling conditions 1 and 2.

(1) Cooling Condition 1: The cooling rate from the temperature of the plating bath to 275 degrees C. needs to be controlled to at least 10 degrees C. per second in the exemplary embodiment. The cooling rate of at least 10 degrees C. per second can promote the formation of the structure I. In consideration of slow cooling in a later stage, the cooling rate from the temperature of the plating bath to 275 degrees C. is preferably at most 40 degrees C. per second.

(2) Cooling Condition 2: The temperature of the plated steel sheet is cooled down in a temperature range from 275 to 180 degrees C. at an average cooling rate of 0.095 to 1.9 degrees C. per second.

The structure I is formed in the Al primary crystal only by cooling under the conditions 1 and 2. When the cooling rate in the cooling condition 2 exceeds 1.9 degrees C. per second, the structure I is not formed at all or not sufficiently formed, so that the entire Al crystal is composed of the structure II. Accordingly, the upper limit of the cooling rate is set to 1.9 degrees C. per second. On the other hand, when the cooling rate is less than 0.095 degrees C. per second, the structure I is not formed at all or not sufficiently formed, so that corrosion resistance is not improved. Moreover, when the cooling rate is less than 0.095 degrees C. per second, the plating and the steel substrate are diffused excessively, and as a result, the interface alloy layer, which is formed of the Al—Fe intermetallic compound, grows to have a thickness exceeding 2 μm, resulting in a reduction in chipping resistance. Further, when the cooling rate is less than 0.095 degrees C. per second, other intermetallic compounds, which are generated from impurities derived from the plating bath and impurities diffused from the steel substrate, are likely to be generated. Accordingly, chipping resistance is easily reduced. Accordingly, the lower limit of the cooing rate is set to 0.095 degrees C. per second.

(3) Cooling Condition 3: Subsequent to the cooling under the conditions 1 and 2, the cooling condition in a range from 180 degrees C. to the room temperature is not particularly limited. However, the average cooling rate is desirably at least 2 degrees C. per second in order to inhibit the growth of the interface alloyed layer.

Figure 2:
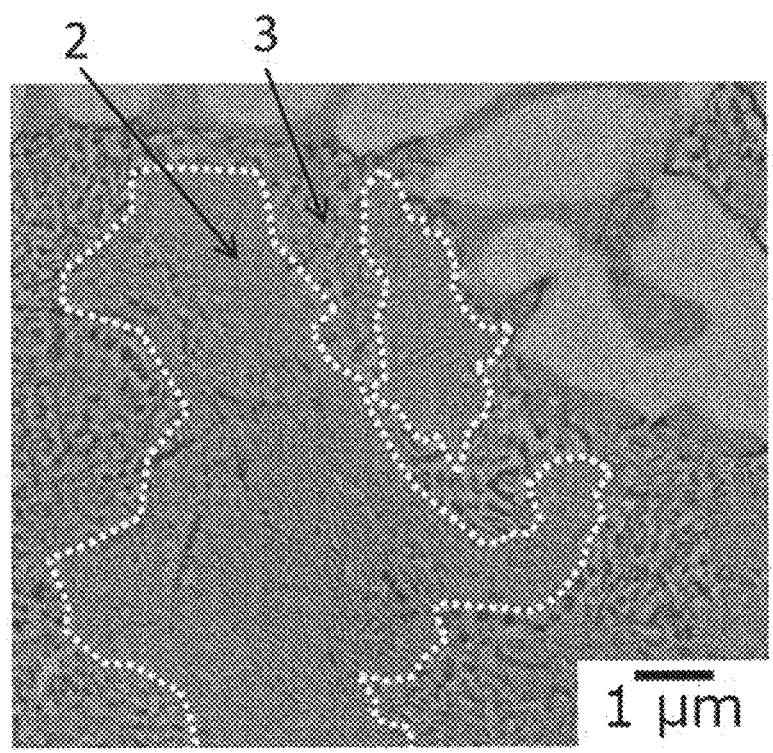
FIG. 2 shows a BSE image (Example 20) of a region I in FIG. 1, taken at 10000-fold magnification.

The above-described FIGS. 1 and 2 exemplarily show the plated structure formed according to the method of manufacturing the hot-dip galvanized steel sheet of the invention, in which the structure I is formed. Since the plated steel sheet obtained in the exemplary embodiment of the invention is a hot-dip plated layer, the interface alloyed layer formed of the Al—Fe intermetallic compound having a size of less than 1 μm is inevitably formed at an interface between the plated layer and the steel sheet. Moreover, when a total abundance ratio of intermetallic compounds (other intermetallic compounds) containing at least one of Fe, Mn, Ti, Sn, In, Bi, Pb or B as inevitable impurities in the plated layer is regulated to 3% or less by the area fraction, other intermetallic compounds hardly affect performance of the plated steel sheet. On the other hand, when the area fraction of other intermetallic compounds exceeds 3%, corrosion resistance and chipping resistance are deteriorated.

A method of analyzing the structure of the plated steel sheet manufactured by a method of manufacturing the hot-dip galvanized steel sheet will be described below.

A component composition of the plated layer can be grasped by immersing the plated steel sheet in 10% HCl in which an inhibitor is added and subjecting a peeling solution to ICP analysis.

Constituent phases of the plated layer are analyzed by X-ray diffraction using a Cu target from a top layer of the plated layer. It can be confirmed that the constituent phases obtained in the exemplary embodiment of the invention are mainly a Zn phase, an Al phase and an $MgZn_2$ phase forming the plated layer. Other phases are not observed. The $Mg_2Si$ phase, which is included at a trace amount, cannot be observed as a main peak by the X-ray diffraction.

The structure contained in the plated layer can also be analyzed by using a transmission electron microscope (TEM). The structure can be checked using a normal bright field image, and a crystal grain size of the Zn phase and the Al phase can be easily measured by using a dark field image. Also, by identifying the crystal structure of the crystal phase present in the phases from the diffraction pattern, the Zn phase, the Al phase and the $MgZn_2$ phase can be identified. A thickness of the layered Al phase and a thickness of the layered Zn phase in the structure I and a lamellar space of the structure I can be easily measured by using the bright field image and the dark field image of the TEM. Also, the thickness of the layered Al phase and the thickness of the layered Zn phase in the structure I and the lamellar space of the structure I can be measured from an SEM image taken at about 30000-fold magnification.

The structure contained in the plated layer can also be analyzed by analyzing a reflection electron image of a scanning electron microscope (SEM) for observing a cross section of the plated layer. Many crystal phases contained in the plated layer are usually formed of the Al element and the Zn element. Accordingly, as shown in the reflection electron image in FIG. 1, contrast between light and shade is exhibited according to the composition of elements contained in the crystal phases, specifically, a black part has a high Al concentration and a white part has a high Zn concentration. Accordingly, by simple image analysis, the area fraction of the black part and the white part in the plated layer can be measured to be defined as the area fraction between the Al phase and the Zn phase contained in the plated layer.

The area fraction between the structure I and the structure II can be estimated from the respective area fractions by using a commercially available drawing software to draw a border line between the structure I having the lamellar structure and the structure II formed of the granular Zn phase and the granular Al phase on the SEM image taken at about 5000-fold magnification and analyze the SEM image. The area fraction of $Mg_2Si$ contained in the plated layer can be grasped from the area fraction between Mg and Si present in an element mapping image prepared using EDS.

Evaluation of the performance of the plated layer will be described.

The post-coating corrosion resistance of the plated layer can be evaluated by subjecting a sample of a plated steel sheet to a Zn phosphate treatment and electrodeposition coating, producing cross cuts reaching the steel substrate, subjecting the coated plated steel sheet to a composite cycle corrosion test, and measuring the maximum blistering width around the cross cuts caused by the corrosion test to obtain an average in terms of the maximum blistering width. A sample having a small blistering width is evaluated as excellent in corrosion resistance. Further, since the generation of red rust significantly deteriorates an appearance of the coated plated steel sheet, a sample having a longer time elapsed before red rust is generated is usually evaluated to have a favorable corrosion resistance.

Chipping resistance of the plated layer can be evaluated by subjecting the plated layer to the same electrodeposition coating as in the evaluation of the post-coating corrosion resistance, subsequently subjecting the plated layer to intermediate coating, top coating and clear coating to form a four-layer coating film, causing a crushed stone to collide with the coating film kept at a predetermined constant temperature, visually observing a degree of peeling, and observing the degree of peeling visually or by an image processing.

EXAMPLE(S)

Tables 1-1 to 1-6 show Examples described in the exemplary embodiment of the invention.

A plating bath containing the components shown in Tables 1-1 and 1-2 was prepared. A temperature of the plating bath was set in a range from 455 to 585 degrees C. A cold-rolled steel sheet (carbon concentration of 0.2%) having a 0.8-mm thickness was used as a steel substrate for plating. The steel substrate was cut to 100 mm×200 mm, and then plated with a batch type hot-dip plating apparatus manufactured by NIPPON STEEL CORPORATION. The sheet temperature was monitored by using thermocouple spot-welded to the central part of the steel substrate for plating.

Before being immersed into the plating bath, a surface of the steel substrate for plating whose temperature was 800 degrees C. was reduced by $N_2$-5% $H_2$ gas in a furnace whose oxygen concentration was 20 ppm or less, cooled by $N_2$ gas to cause the temperature of the to-be-immersed sheet to reach a temperature that is higher by 20 degrees C. than the bath temperature, and then the sheet was immersed in the plating bath for about three seconds. After being immersed in the plating bath, the sheet was pulled up at a pulling speed of 100 mm per second. During drawing out the plated sheet, a plating amount was adjusted with $N_2$ wiping gas.

After the steel sheet was drawn out from the plating bath, the plated layer was cooled from the temperature of the plating bath to the room temperature under the conditions (cooling conditions 1 to 3) shown in Tables 1-1 and 1-2.

TABLE 1-1

| Class | No. | Components of Plating Bath (mass %) | | | | | Film Thickness of Plating μm | Melting Point of Plating °C. | Temp. of Plating Bath °C. | Cooling Conditions | | |
|---|---|---|---|---|---|---|---|---|---|---|---|---|
| | | Zn | Al | Mg | Si | Total of Inevitable Impurities | | | | Cooling Rate 1 °C./sec | Cooling Rate 2 °C./sec | Cooling Rate 3 °C./sec |
| Comparative | 1 | 89.60 | 8.00 | 2.00 | 0.20 | 0.20 | 7 | 410 | 440 | 10 | 1.2 | 5 |
| Comparative | 2 | 87.40 | 10.40 | 2.00 | 0.20 | 0.00 | 7 | 425 | 455 | 10 | 0.05 | 5 |
| Example | 3 | 88.50 | 10.20 | 1.10 | 0.20 | 0.00 | 7 | 425 | 455 | 10 | 1.6 | 5 |
| Example | 4 | 86.15 | 10.50 | 3.10 | 0.05 | 0.20 | 7 | 427 | 457 | 10 | 0.5 | 10 |
| Comparative | 5 | 88.40 | 10.10 | 1.10 | 0.00 | 0.40 | 9 | 429 | 459 | 10 | 0.3 | 5 |
| Example | 6 | 86.20 | 12.10 | 1.50 | 0.20 | 0.00 | 7 | 430 | 460 | 10 | 0.4 | 5 |
| Example | 7 | 82.20 | 14.20 | 3.20 | 0.20 | 0.20 | 10 | 440 | 470 | 10 | 0.4 | 20 |
| Example | 8 | 79.70 | 16.10 | 4.00 | 0.20 | 0.00 | 7 | 450 | 480 | 10 | 0.3 | 5 |
| Example | 9 | 78.60 | 18.20 | 3.00 | 0.20 | 0.00 | 7 | 460 | 490 | 10 | 1.0 | 5 |
| Comparative | 10 | 75.80 | 18.00 | 2.00 | 4.10 | 0.10 | 7 | 460 | 490 | 10 | 0.3 | 5 |
| Comparative | 11 | 81.20 | 18.10 | 0.30 | 0.20 | 0.20 | 7 | 460 | 490 | 10 | 1.5 | 5 |
| Example | 12 | 77.70 | 19.00 | 3.00 | 0.20 | 0.10 | 7 | 465 | 495 | 10 | 0.5 | 5 |
| Example | 13 | 77.70 | 20.10 | 2.00 | 0.20 | 0.00 | 14 | 475 | 505 | 10 | 0.2 | 5 |
| Example | 14 | 74.60 | 22.00 | 3.00 | 0.20 | 0.20 | 7 | 480 | 510 | 10 | 0.3 | 5 |
| Example | 15 | 73.10 | 22.30 | 3.40 | 0.20 | 1.00 | 7 | 480 | 510 | 10 | 0.8 | 5 |
| Example | 16 | 73.70 | 22.10 | 4.00 | 0.20 | 0.00 | 7 | 480 | 510 | 10 | 0.1 | 10 |
| Example | 17 | 74.30 | 22.10 | 3.30 | 0.20 | 0.10 | 20 | 481 | 511 | 10 | 0.2 | 5 |
| Comparative | 18 | 74.40 | 22.00 | 3.00 | 0.20 | 0.40 | 7 | 480 | 510 | 7 | 1.5 | 5 |
| Comparative | 19 | 75.60 | 22.00 | 2.00 | 0.20 | 0.20 | 31 | 480 | 510 | 10 | 7 | 5 |
| Example | 20 | 72.90 | 23.90 | 3.00 | 0.20 | 0.00 | 32 | 485 | 515 | 10 | 0.5 | 5 |
| Example | 21 | 72.50 | 25.80 | 1.30 | 0.20 | 0.20 | 7 | 490 | 520 | 10 | 0.2 | 5 |
| Comparative | 22 | 70.99 | 27.00 | 2.00 | 0.01 | 0.00 | 12 | 500 | 530 | 10 | 0.1 | 5 |
| Comparative | 23 | 70.70 | 27.00 | 2.00 | 0.20 | 0.10 | 11 | 500 | 530 | 10 | 0.01 | 5 |
| Example | 24 | 68.80 | 28.00 | 3.00 | 0.20 | 0.00 | 7 | 505 | 535 | 10 | 0.3 | 5 |
| Example | 25 | 67.40 | 30.10 | 2.00 | 0.20 | 0.30 | 15 | 510 | 540 | 10 | 0.3 | 5 |
| Example | 26 | 64.90 | 32.00 | 2.90 | 0.20 | 0.00 | 7 | 520 | 550 | 10 | 0.3 | 10 |
| Example | 27 | 61.70 | 34.10 | 4.00 | 0.20 | 0.00 | 7 | 525 | 555 | 10 | 0.2 | 5 |
| Example | 28 | 60.50 | 36.20 | 3.00 | 0.20 | 0.10 | 7 | 530 | 560 | 10 | 0.3 | 5 |
| Example | 29 | 61.30 | 38.00 | 0.50 | 0.20 | 0.00 | 7 | 535 | 565 | 10 | 0.2 | 5 |
| Example | 30 | 57.50 | 40.00 | 2.00 | 0.20 | 0.30 | 5 | 540 | 570 | 10 | 0.1 | 5 |
| Comparative | 31 | 56.90 | 39.80 | 3.00 | 0.20 | 0.10 | 7 | 550 | 580 | 10 | 0.07 | 5 |
| Comparative | 32 | 54.80 | 42.00 | 3.00 | 0.20 | 0.00 | 7 | 550 | 580 | 10 | 0.2 | 5 |
| Example | 33 | 87.30 | 10.00 | 2.00 | 0.50 | 0.20 | 7 | 420 | 450 | 30 | 0.3 | 5 |
| Example | 34 | 84.60 | 11.90 | 3.00 | 0.50 | 0.00 | 7 | 430 | 460 | 10 | 0.1 | 5 |
| Example | 35 | 81.50 | 14.00 | 3.00 | 0.50 | 1.00 | 20 | 440 | 470 | 10 | 0.2 | 5 |
| Example | 36 | 80.00 | 16.50 | 3.00 | 0.50 | 0.00 | 7 | 450 | 480 | 10 | 0.2 | 5 |
| Comparative | 37 | 81.30 | 17.40 | 0.40 | 0.50 | 0.40 | 7 | 456 | 486 | 10 | 0.1 | 5 |
| Example | 38 | 77.30 | 18.00 | 4.00 | 0.50 | 0.20 | 7 | 460 | 490 | 10 | 0.1 | 5 |
| Example | 39 | 75.90 | 20.10 | 3.00 | 0.50 | 0.50 | 7 | 475 | 505 | 10 | 0.1 | 5 |
| Comparative | 40 | 76.69 | 20.20 | 3.10 | 0.01 | 0.00 | 9 | 460 | 490 | 10 | 0.1 | 5 |
| Example | 41 | 74.50 | 22.00 | 3.00 | 0.50 | 0.00 | 7 | 480 | 510 | 10 | 0.1 | 5 |
| Example | 42 | 74.10 | 22.50 | 2.80 | 0.50 | 0.10 | 50 | 480 | 510 | 10 | 0.5 | 5 |
| Comparative | 43 | 75.30 | 22.10 | 2.00 | 0.50 | 0.10 | 7 | 480 | 510 | 10 | 2.3 | 5 |
| Comparative | 44 | 75.10 | 22.40 | 2.00 | 0.50 | 0.00 | 7 | 480 | 510 | 8 | 1.5 | 5 |
| Comparative | 45 | 77.50 | 22.00 | 0.00 | 0.50 | 0.00 | 7 | 480 | 510 | 10 | 0.5 | 5 |
| Example | 46 | 71.40 | 24.00 | 4.00 | 0.50 | 0.10 | 7 | 485 | 515 | 10 | 0.5 | 5 |
| Example | 47 | 69.90 | 26.10 | 3.50 | 0.50 | 0.00 | 15 | 490 | 520 | 10 | 0.1 | 5 |
| Comparative | 48 | 71.50 | 26.00 | 2.00 | 0.50 | 0.00 | 7 | 491 | 521 | 10 | 0.08 | 5 |
| Example | 49 | 69.20 | 28.10 | 2.00 | 0.50 | 0.20 | 7 | 505 | 535 | 10 | 0.2 | 5 |
| Comparative | 50 | 65.90 | 29.00 | 4.50 | 0.50 | 0.10 | 7 | 505 | 535 | 10 | 0.5 | 5 |

TABLE 1-2

| Class | No. | Components of Plating Bath (mass %) | | | | | Film Thickness of Plating μm | Melting Point of Plating ° C. | Temp. of Plating Bath ° C. | Cooling Conditions | | |
|---|---|---|---|---|---|---|---|---|---|---|---|---|
| | | Zn | Al | Mg | Si | Total of Inevitable Impurities | | | | Cooling Rate 1 ° C./sec | Cooling Rate 2 ° C./sec | Cooling Rate 3 ° C./sec |
| Example | 51 | 65.70 | 30.60 | 3.20 | 0.50 | 0.00 | 7 | 510 | 540 | 20 | 0.5 | 5 |
| Example | 52 | 64.10 | 32.00 | 3.40 | 0.50 | 0.00 | 7 | 520 | 550 | 10 | 0.2 | 5 |
| Example | 53 | 59.10 | 38.20 | 2.00 | 0.50 | 0.20 | 18 | 535 | 565 | 10 | 0.1 | 2 |
| Example | 54 | 56.10 | 40.20 | 3.00 | 0.50 | 0.20 | 7 | 540 | 570 | 10 | 0.1 | 5 |
| Comparative | 55 | 52.20 | 42.00 | 3.00 | 2.50 | 0.30 | 7 | 550 | 580 | 10 | 0.3 | 5 |
| Comparative | 56 | 90.00 | 7.00 | 2.00 | 1.00 | 0.00 | 7 | 401 | 431 | 10 | 0.3 | 5 |
| Example | 57 | 85.70 | 10.30 | 3.00 | 1.00 | 0.00 | 7 | 475 | 505 | 10 | 0.5 | 5 |
| Comparative | 58 | 83.90 | 14.10 | 2.00 | 0.00 | 0.00 | 14 | 460 | 490 | 10 | 0.9 | 5 |
| Example | 59 | 80.40 | 15.50 | 3.00 | 1.00 | 0.10 | 7 | 475 | 505 | 10 | 0.9 | 5 |
| Example | 60 | 74.90 | 20.10 | 4.00 | 1.00 | 0.00 | 14 | 477 | 507 | 10 | 0.9 | 5 |
| Example | 61 | 73.50 | 22.30 | 3.10 | 1.00 | 0.10 | 7 | 487 | 517 | 10 | 0.1 | 5 |
| Example | 62 | 74.00 | 22.00 | 3.00 | 1.00 | 0.00 | 7 | 487 | 517 | 10 | 0.2 | 15 |
| Example | 63 | 74.50 | 22.50 | 2.00 | 1.00 | 0.00 | 7 | 487 | 517 | 10 | 0.5 | 5 |
| Comparative | 64 | 74.00 | 22.00 | 3.00 | 1.00 | 0.00 | 7 | 487 | 517 | 10 | 8.0 | 5 |
| Comparative | 65 | 74.00 | 22.00 | 3.00 | 1.00 | 0.00 | 7 | 487 | 517 | 10 | 0.04 | 5 |
| Example | 66 | 75.00 | 22.00 | 2.00 | 1.00 | 0.00 | 7 | 481 | 511 | 10 | 0.9 | 5 |
| Comparative | 67 | 72.89 | 24.00 | 3.00 | 0.01 | 0.10 | 7 | 481 | 511 | 10 | 0.1 | 5 |
| Example | 68 | 70.90 | 25.00 | 3.00 | 1.00 | 0.10 | 7 | 483 | 513 | 10 | 0.5 | 5 |
| Example | 69 | 65.70 | 30.10 | 3.00 | 1.00 | 0.20 | 5 | 510 | 540 | 10 | 0.5 | 5 |
| Example | 70 | 62.00 | 35.00 | 2.00 | 1.00 | 0.00 | 7 | 528 | 558 | 10 | 0.5 | 5 |
| Example | 71 | 79.80 | 15.20 | 2.00 | 2.00 | 1.00 | 7 | 510 | 540 | 10 | 0.5 | 5 |
| Example | 72 | 75.00 | 20.00 | 3.00 | 2.00 | 0.00 | 7 | 520 | 550 | 10 | 0.1 | 5 |
| Example | 73 | 72.90 | 22.10 | 3.00 | 2.00 | 0.00 | 14 | 540 | 570 | 10 | 0.5 | 5 |
| Example | 74 | 71.90 | 22.00 | 4.00 | 2.00 | 0.10 | 7 | 540 | 570 | 10 | 0.5 | 5 |
| Comparative | 75 | 71.90 | 22.00 | 3.00 | 2.00 | 1.10 | 7 | 540 | 570 | 10 | 0.5 | 5 |
| Example | 76 | 72.30 | 22.50 | 3.20 | 2.00 | 0.00 | 7 | 540 | 570 | 10 | 0.5 | 5 |
| Example | 77 | 70.10 | 24.90 | 3.00 | 2.00 | 0.00 | 7 | 540 | 570 | 10 | 0.2 | 5 |
| Example | 78 | 63.80 | 30.10 | 4.00 | 2.00 | 0.10 | 7 | 530 | 560 | 10 | 0.5 | 2 |
| Example | 79 | 59.50 | 35.30 | 3.00 | 2.00 | 0.20 | 7 | 535 | 565 | 10 | 0.5 | 5 |
| Example | 80 | 73.30 | 22.10 | 2.00 | 2.50 | 0.10 | 14 | 545 | 575 | 10 | 0.4 | 5 |
| Example | 81 | 69.60 | 24.90 | 3.00 | 2.50 | 0.00 | 7 | 550 | 580 | 10 | 0.4 | 5 |
| Example | 82 | 55.30 | 40.10 | 2.00 | 2.50 | 0.10 | 7 | 555 | 585 | 10 | 0.4 | 5 |
| Comparative | 83 | 52.30 | 42.00 | 3.00 | 2.50 | 0.20 | 7 | 550 | 580 | 10 | 0.3 | 5 |
| Example | 84 | 71.00 | 22.00 | 3.00 | 4.00 | 0.00 | 7 | 545 | 575 | 10 | 0.3 | 5 |
| Example | 85 | 66.70 | 25.30 | 4.00 | 4.00 | 0.00 | 14 | 550 | 580 | 10 | 0.2 | 15 |
| Example | 86 | 52.70 | 40.20 | 3.00 | 4.00 | 0.10 | 7 | 555 | 585 | 10 | 0.1 | 5 |
| Comparative | 87 | 51.90 | 42.00 | 2.00 | 4.00 | 0.10 | 7 | 550 | 580 | 10 | 0.5 | 5 |
| Comparative | 88 | 53.50 | 40.00 | 2.00 | 4.50 | 0.00 | 7 | 570 | 600 | 10 | 0.5 | 200 |
| Comparative | 89 | | | | | Commercially available galvanized steel sheet | | | | | | |
| | 90 | | | | | Galvannealed steel sheet | | | | | | |
| | 91 | | | | | Electrogalvanized steel sheet | | | | | | |

TABLE 1-3

| Class | No. | Components of Plating Bath (mass %) | | | | | Structure | | | | | | | |
|---|---|---|---|---|---|---|---|---|---|---|---|---|---|---|
| | | Zn | Al | Mg | Si | Total of Inevitable Impurities | Structure I Area Fraction | Structure II Area Fraction | Zn/Al/MgZn$_2$ ternary eutectic structure Area Fraction | Zn/Al binary eutectic structure Area Fraction | Mg$_2$Si Area Fraction | Si Area Fraction | Other intermetallic compound Area Fraction | Interface alloyed layer Thickness (μm) |
| Comparative | 1 | 89.72 | 7.90 | 2.00 | 0.18 | 0.20 | 1 | 12 | 87 | 0 | 0 | 0 | 0 | 0.2 |
| Comparative | 2 | 87.80 | 10.00 | 2.00 | 0.20 | 0.00 | 0 | 8 | 92 | 0 | 0 | 0 | 0 | 2.2 |
| Example | 3 | 88.82 | 10.00 | 1.00 | 0.18 | 0.00 | 5 | 7 | 87 | 0 | 1 | 0 | 0 | 0.1 |
| Example | 4 | 86.65 | 10.10 | 3.00 | 0.05 | 0.20 | 8 | 5 | 87 | 0 | 0 | 0 | 0 | 0.1 |
| Comparative | 5 | 52.00 | 6.00 | 1.00 | 0.00 | 41.00 | 1 | 5 | 6 | 0 | 0 | 0 | 88 | 6.1 |
| Example | 6 | 86.41 | 11.90 | 1.50 | 0.19 | 0.00 | 15 | 2 | 83 | 0 | 0 | 0 | 0 | 0.3 |
| Example | 7 | 82.60 | 14.00 | 3.00 | 0.20 | 0.20 | 18 | 3 | 78 | 0 | 1 | 0 | 0 | 0.4 |
| Example | 8 | 80.00 | 15.80 | 4.00 | 0.20 | 0.00 | 21 | 5 | 74 | 0 | 0 | 0 | 0 | 0.6 |
| Example | 9 | 78.77 | 18.00 | 3.00 | 0.23 | 0.00 | 20 | 10 | 70 | 0 | 0 | 0 | 0 | 0.6 |
| Comparative | 10 | 76.00 | 17.80 | 2.00 | 4.10 | 0.10 | 6 | 14 | 76 | 0 | 0 | 0 | 4 | 0.6 |
| Comparative | 11 | 81.30 | 18.00 | 0.30 | 0.20 | 0.20 | 6 | 15 | 14 | 65 | 0 | 0 | 0 | 0.3 |
| Example | 12 | 77.90 | 18.80 | 3.00 | 0.20 | 0.10 | 23 | 10 | 67 | 0 | 0 | 0 | 0 | 0.9 |
| Example | 13 | 78.00 | 19.80 | 2.00 | 0.20 | 0.00 | 26 | 10 | 64 | 0 | 0 | 0 | 0 | 0.6 |
| Example | 14 | 75.24 | 21.50 | 2.90 | 0.16 | 0.20 | 31 | 8 | 61 | 0 | 0 | 0 | 0 | 0.9 |
| Example | 15 | 73.40 | 22.00 | 3.40 | 0.20 | 1.00 | 26 | 14 | 60 | 0 | 0 | 0 | 0 | 1.1 |
| Example | 16 | 74.02 | 21.80 | 4.00 | 0.18 | 0.00 | 30 | 10 | 60 | 0 | 0 | 0 | 0 | 0.9 |

TABLE 1-3-continued

| | | Components of Plating Bath (mass %) | | | | | Structure | | | | | | |
|---|---|---|---|---|---|---|---|---|---|---|---|---|---|
| | | | | | | | Structure I | Structure II | Zn/Al/MgZn$_2$ ternary eutectic | Zn/Al binary eutectic | | | Interface alloyed layer |
| | | | | | | | | | | | | Other intermetallic | |
| Class | No. | Zn | Al | Mg | Si | Total of Inevitable Impurities | Area Fraction | Area Fraction | structure Area Fraction | structure Area Fraction | Mg$_2$Si Area Fraction | Si Area Fraction | compound Area Fraction | Thickness (μm) |
| Example | 17 | 75.00 | 21.70 | 3.00 | 0.20 | 0.10 | 51 | 0 | 49 | 0 | 0 | 0 | 0 | 1.1 |
| Comparative | 18 | 75.40 | 21.00 | 3.00 | 0.20 | 0.40 | 1 | 36 | 63 | 0 | 0 | 0 | 0 | 1 |
| Comparative | 19 | 76.10 | 21.60 | 1.90 | 0.20 | 0.20 | 0 | 40 | 59 | 0 | 1.0 | 0 | 0 | 0.1 |
| Example | 20 | 72.83 | 24.00 | 3.00 | 0.17 | 0.00 | 31 | 13 | 55 | 0 | 1.0 | 0 | 0 | 0.2 |
| Example | 21 | 72.50 | 26.00 | 1.10 | 0.20 | 0.20 | 33 | 16 | 51 | 0 | 0 | 0 | 0 | 0.8 |
| Comparative | 22 | 54.00 | 19.99 | 1.50 | 0.01 | 24.50 | 1 | 9 | 51 | 0 | 0 | 0 | 39 | 5.8 |
| Comparative | 23 | 65.50 | 25.00 | 1.80 | 0.20 | 7.50 | 0 | 52 | 41 | 0 | 0 | 0 | 7 | 4 |
| Example | 24 | 69.40 | 27.50 | 2.90 | 0.20 | 0.00 | 34 | 20 | 46 | 0 | 0 | 0 | 0 | 1.2 |
| Example | 25 | 67.80 | 29.70 | 2.00 | 0.20 | 0.30 | 36 | 22 | 42 | 0 | 0 | 0 | 0 | 0.9 |
| Example | 26 | 64.88 | 31.80 | 3.10 | 0.22 | 0.00 | 38 | 22 | 40 | 0 | 0 | 0 | 0 | 1.6 |
| Example | 27 | 60.72 | 35.10 | 4.00 | 0.18 | 0.00 | 41 | 24 | 34 | 0 | 1 | 0 | 0 | 1.4 |
| Example | 28 | 60.70 | 36.00 | 3.00 | 0.20 | 0.10 | 41 | 21 | 38 | 0 | 0 | 0 | 0 | 1.7 |
| Example | 29 | 61.21 | 38.10 | 0.50 | 0.19 | 0.00 | 42 | 23 | 20 | 15 | 0 | 0 | 0 | 1.8 |
| Example | 30 | 59.00 | 38.40 | 2.00 | 0.20 | 0.40 | 44 | 21 | 35 | 0 | 0 | 0 | 0 | 0.7 |
| Comparative | 31 | 53.01 | 36.00 | 2.80 | 0.19 | 8.00 | 0 | 51 | 44 | 0 | 0 | 0 | 5 | 3.1 |
| Comparative | 32 | 54.90 | 42.00 | 2.90 | 0.20 | 0.00 | 0 | 67 | 33 | 0 | 0 | 0 | 0 | 0.2 |
| Example | 33 | 87.32 | 10.00 | 2.00 | 0.48 | 0.20 | 7 | 6 | 86 | 0 | 1 | 0 | 0 | 0.1 |
| Example | 34 | 84.41 | 12.10 | 3.00 | 0.49 | 0.00 | 9 | 8 | 83 | 0 | 0 | 0 | 0 | 0.3 |
| Example | 35 | 81.61 | 13.90 | 3.00 | 0.49 | 1.00 | 9 | 13 | 75 | 0 | 0 | 0 | 3.0 | 0.6 |
| Example | 36 | 80.60 | 15.90 | 3.00 | 0.50 | 0.00 | 15 | 11 | 74 | 0 | 0 | 0 | 0 | 0.7 |
| Comparative | 37 | 81.70 | 17.00 | 0.40 | 0.50 | 0.40 | 17 | 15 | 16 | 52 | 0 | 0 | 0 | 0.6 |
| Example | 38 | 77.50 | 17.80 | 4.00 | 0.50 | 0.20 | 19 | 11 | 70 | 0 | 0 | 0 | 0 | 0.8 |
| Example | 39 | 76.22 | 19.80 | 3.00 | 0.48 | 0.50 | 22 | 13 | 65 | 0 | 0 | 0 | 0 | 0.7 |
| Comparative | 40 | 68.04 | 17.70 | 2.65 | 0.01 | 11.60 | 1 | 17 | 66 | 0 | 0 | 0 | 16 | 3.5 |
| Example | 41 | 74.60 | 21.90 | 3.00 | 0.50 | 0.00 | 30 | 9 | 61 | 0 | 0 | 0 | 0 | 0.8 |
| Example | 42 | 74.20 | 22.30 | 2.90 | 0.50 | 0.10 | 31 | 8 | 61 | 0 | 0 | 0 | 0 | 0.7 |
| Comparative | 43 | 75.40 | 22.00 | 2.00 | 0.50 | 0.10 | 0 | 39 | 61 | 0 | 0 | 0 | 0 | 0.6 |
| Comparative | 44 | 75.50 | 22.00 | 2.00 | 0.50 | 0.00 | 0 | 42 | 58 | 0 | 0 | 0 | 0 | 0.4 |
| Comparative | 45 | 77.70 | 21.80 | 0.00 | 0.50 | 0.00 | 24 | 17 | 0 | 59 | 0 | 0 | 0 | 0.6 |
| Example | 46 | 71.23 | 24.20 | 4.00 | 0.47 | 0.10 | 33 | 12 | 55 | 0 | 0 | 0 | 0 | 0.8 |
| Example | 47 | 70.40 | 26.10 | 3.00 | 0.50 | 0.00 | 33 | 16 | 51 | 0 | 0 | 0 | 0 | 0.8 |
| Comparative | 48 | 71.70 | 25.90 | 1.90 | 0.50 | 0.00 | 0 | 49 | 51 | 0 | 0 | 0 | 0 | 2.3 |
| Example | 49 | 69.30 | 28.00 | 2.00 | 0.50 | 0.20 | 34 | 19 | 47 | 0 | 0 | 0 | 0 | 0.8 |
| Comparative | 50 | 65.70 | 29.20 | 4.50 | 0.50 | 0.10 | 1 | 59 | 40 | 0 | 0 | 0 | 0 | 0.7 |

TABLE 1-4

| | | Components of Plating Bath (mass %) | | | | | Structure | | | | | | |
|---|---|---|---|---|---|---|---|---|---|---|---|---|---|
| | | | | | | | Structure I | Structure II | Zn/Al/MgZn$_2$ ternary eutectic | Zn/Al binary eutectic | | | Interface alloyed layer |
| | | | | | | | | | | | | Other intermetallic | |
| Class | No. | Zn | Al | Mg | Si | Total of Inevitable Impurities | Area Fraction | Area Fraction | structure Area Fraction | structure Area Fraction | Mg$_2$Si Area Fraction | Si Area Fraction | compound Area Fraction | Thickness (μm) |
| Example | 51 | 66.42 | 29.90 | 3.20 | 0.48 | 0.00 | 42 | 16 | 42 | 0 | 0 | 0 | 0 | 1.1 |
| Example | 52 | 64.60 | 31.50 | 3.40 | 0.50 | 0.00 | 43 | 20 | 37 | 0 | 0 | 0 | 0 | 1.5 |
| Example | 53 | 59.31 | 38.00 | 2.00 | 0.49 | 0.20 | 43 | 22 | 35 | 0 | 0 | 0 | 0 | 1.4 |
| Example | 54 | 56.30 | 40.00 | 3.00 | 0.50 | 0.20 | 41 | 26 | 33 | 0 | 0 | 0 | 0 | 1.7 |
| Comparative | 55 | 52.30 | 42.00 | 2.90 | 2.50 | 0.30 | 0 | 65 | 35 | 0 | 0 | 0 | 0 | 1.4 |
| Comparative | 56 | 90.10 | 7.00 | 2.00 | 0.90 | 0.00 | 0 | 7 | 93 | 0 | 0 | 0 | 0 | 0.2 |
| Example | 57 | 86.10 | 10.00 | 3.00 | 0.90 | 0.00 | 7 | 5 | 88 | 0 | 0 | 0 | 0 | 0.1 |
| Comparative | 58 | 77.20 | 12.90 | 1.80 | 0.00 | 8.10 | 1 | 40 | 41 | 0 | 0 | 0 | 18 | 5.1 |
| Example | 59 | 81.10 | 14.80 | 3.00 | 1.00 | 0.10 | 15 | 8 | 75 | 0 | 2 | 0 | 0 | 0.6 |
| Example | 60 | 75.00 | 20.00 | 4.00 | 1.00 | 0.00 | 25 | 10 | 65 | 0 | 0 | 0 | 0 | 0.3 |
| Example | 61 | 74.00 | 21.90 | 3.10 | 0.90 | 0.10 | 36 | 3 | 61 | 0 | 0 | 0 | 0 | 0.3 |
| Example | 62 | 74.10 | 22.00 | 2.90 | 1.00 | 0.00 | 34 | 7 | 57 | 0 | 2 | 0 | 0 | 0.5 |
| Example | 63 | 74.90 | 22.10 | 2.00 | 1.00 | 0.00 | 24 | 15 | 61 | 0 | 0 | 0 | 0 | 0.6 |
| Comparative | 64 | 73.80 | 22.20 | 3.00 | 1.00 | 0.00 | 0 | 39 | 61 | 0 | 0 | 0 | 0 | 0.6 |
| Comparative | 65 | 74.20 | 21.90 | 2.90 | 1.00 | 0.00 | 0 | 41 | 59 | 0 | 0 | 0 | 0 | 2.2 |
| Example | 66 | 75.20 | 21.80 | 2.00 | 1.00 | 0.00 | 24 | 15 | 61 | 0 | 0 | 0 | 0 | 0.3 |
| Comparative | 67 | 67.50 | 22.20 | 2.70 | 0.01 | 7.60 | 2 | 35 | 53 | 0 | 0 | 0 | 10 | 3.5 |
| Example | 68 | 71.30 | 24.60 | 3.00 | 1.00 | 0.10 | 29 | 18 | 51 | 0 | 2 | 0 | 0 | 0.6 |

TABLE 1-4-continued

| | | Components of Plating Bath (mass %) | | | | | Structure I Area Fraction | Structure II Area Fraction | Zn/Al/MgZn₂ ternary eutectic structure Area Fraction | Zn/Al binary eutectic structure Area Fraction | Mg₂Si Area Fraction | Si Area Fraction | Other intermetallic compound Area Fraction | Interface alloyed layer Thickness (μm) |
|---|---|---|---|---|---|---|---|---|---|---|---|---|---|---|
| Class | No. | Zn | Al | Mg | Si | Total of Inevitable Impurities | | | | | | | | |
| Example | 69 | 65.80 | 30.10 | 3.00 | 0.90 | 0.20 | 46 | 12 | 42 | 0 | 0 | 0 | 0 | 0.9 |
| Example | 70 | 62.20 | 34.80 | 2.00 | 1.00 | 0.00 | 48 | 22 | 30 | 0 | 0 | 0 | 0 | 0.6 |
| Example | 71 | 80.20 | 14.80 | 2.00 | 2.00 | 1.00 | 15 | 9 | 76 | 0 | 0 | 0 | 0 | 0.3 |
| Example | 72 | 75.20 | 19.80 | 2.90 | 2.10 | 0.00 | 23 | 13 | 64 | 0 | 0 | 0 | 0 | 0.9 |
| Example | 73 | 73.30 | 21.70 | 3.00 | 2.00 | 0.00 | 21 | 19 | 57 | 0 | 3 | 0 | 0 | 0.3 |
| Example | 74 | 71.80 | 22.10 | 4.00 | 2.00 | 0.10 | 21 | 19 | 60 | 0 | 0 | 0 | 0 | 0.6 |
| Comparative | 75 | 73.70 | 20.10 | 3.00 | 2.00 | 1.20 | 20 | 40 | 35 | 0 | 0 | 0 | 5 | 0.3 |
| Example | 76 | 73.00 | 21.80 | 3.20 | 2.00 | 0.00 | 22 | 18 | 60 | 0 | 0 | 0 | 0 | 0.3 |
| Example | 77 | 70.00 | 25.00 | 3.00 | 2.00 | 0.00 | 26 | 21 | 53 | 0 | 0 | 0 | 0 | 0.6 |
| Example | 78 | 64.10 | 29.80 | 4.00 | 2.00 | 0.10 | 41 | 17 | 42 | 0 | 0 | 0 | 0 | 0.6 |
| Example | 79 | 60.10 | 34.70 | 3.10 | 1.90 | 0.20 | 46 | 24 | 27 | 0 | 3 | 0 | 0 | 0.9 |
| Example | 80 | 73.30 | 22.10 | 2.00 | 2.50 | 0.10 | 13 | 27 | 60 | 0 | 0 | 0 | 0 | 0.7 |
| Example | 81 | 69.80 | 24.70 | 3.00 | 2.50 | 0.00 | 24 | 22 | 54 | 0 | 0 | 0 | 0 | 0.6 |
| Example | 82 | 55.40 | 40.00 | 2.00 | 2.50 | 0.10 | 46 | 30 | 21 | 0 | 3 | 0 | 0 | 0.9 |
| Comparative | 83 | 52.50 | 42.00 | 2.80 | 2.50 | 0.20 | 0 | 68 | 32 | 0 | 0 | 0 | 0 | 0.3 |
| Example | 84 | 71.00 | 22.10 | 2.90 | 4.00 | 0.00 | 21 | 19 | 56 | 0 | 4 | 0 | 0 | 0.6 |
| Example | 85 | 67.20 | 24.80 | 4.00 | 4.00 | 0.00 | 28 | 19 | 53 | 0 | 0 | 0 | 0 | 0.5 |
| Example | 86 | 52.90 | 40.00 | 3.00 | 4.00 | 0.10 | 45 | 31 | 20 | 0 | 4 | 0 | 0 | 0.6 |
| Comparative | 87 | 51.80 | 42.00 | 2.10 | 4.00 | 0.10 | 0 | 64 | 36 | 0 | 0 | 0 | 0 | 0.3 |
| Comparative | 88 | 53.70 | 39.80 | 2.00 | 4.50 | 0.00 | 41 | 28 | 25 | 0 | 0 | 6 | 0 | 0.3 |
| Comparative | 89 | | | | | Commercially available galvanized steel sheet | | | | | | | | |
| | 90 | | | | | Galvannealed steel sheet | | | | | | | | |
| | 91 | | | | | Electrogalvanized steel sheet | | | | | | | | |

TABLE 1-5

| | | Post-coating corrosion resistance | | | | |
|---|---|---|---|---|---|---|
| Class | No. | 60 cycles | 90 cycles | 120 cycles | Chipping resistance | Seizure resistance |
| Comparative | 1 | C | D | D | B | B |
| Comparative | 2 | C | D | D | B | B |
| Example | 3 | A | B | B | A | B |
| Example | 4 | A | B | B | A | B |
| Comparative | 5 | C | D | D | D | B |
| Example | 6 | A | B | B | A | B |
| Example | 7 | A | B | B | A | B |
| Example | 8 | A | A | B | A | B |
| Example | 9 | A | A | B | A | B |
| Comparative | 10 | C | C | D | D | C |
| Comparative | 11 | D | D | D | B | A |
| Example | 12 | A | A | B | A | B |
| Example | 13 | A | A | B | A | A |
| Example | 14 | A | A | B | A | A |
| Example | 15 | A | A | B | A | A |
| Example | 16 | A | A | B | A | A |
| Example | 17 | A | A | A | A | A |
| Comparative | 18 | C | C | B | C | A |
| Comparative | 19 | C | D | C | C | A |
| Example | 20 | A | A | B | A | A |
| Example | 21 | A | A | B | A | A |
| Comparative | 22 | C | D | D | D | A |
| Comparative | 23 | D | D | D | B | A |
| Example | 24 | A | A | B | A | A |
| Example | 25 | A | A | B | A | A |
| Example | 26 | A | A | B | A | A |
| Example | 27 | A | A | A | A | A |
| Example | 28 | A | A | A | A | A |
| Example | 29 | A | A | B | A | A |
| Example | 30 | A | A | A | A | A |
| Comparative | 31 | D | D | D | B | B |
| Comparative | 32 | C | D | D | A | B |
| Example | 33 | A | A | A | A | B |
| Example | 34 | A | A | A | A | B |
| Example | 35 | A | A | A | A | B |
| Example | 36 | A | A | A | A | B |
| Comparative | 37 | C | C | D | A | B |
| Example | 38 | A | A | A | A | B |
| Example | 39 | A | A | A | A | A |
| Comparative | 40 | D | D | D | D | A |
| Example | 41 | A | A | A | A | A |
| Example | 42 | A | A | B | A | B |
| Comparative | 43 | D | D | D | B | B |
| Comparative | 44 | D | D | D | B | B |
| Comparative | 45 | C | D | D | A | B |
| Example | 46 | A | A | A | A | A |
| Example | 47 | A | A | A | A | A |
| Comparative | 48 | D | D | D | B | B |
| Example | 49 | A | A | A | A | A |
| Comparative | 50 | D | D | D | D | B |

TABLE 1-6

| | | Post-coating corrosion resistance | | | | |
|---|---|---|---|---|---|---|
| Class | No. | 60 cycles | 90 cycles | 120 cycles | Chipping resistance | Seizure resistance |
| Example | 51 | A | A | A | A | A |
| Example | 52 | A | A | A | A | A |
| Example | 53 | A | A | A | A | A |
| Example | 54 | A | A | A | A | A |
| Comparative | 55 | C | C | D | A | A |
| Comparative | 56 | D | D | D | B | B |
| Example | 57 | A | B | B | A | B |

TABLE 1-6-continued

| Class | No. | Post-coating corrosion resistance | | | Chipping resistance | Seizure resistance |
|---|---|---|---|---|---|---|
| | | 60 cycles | 90 cycles | 120 cycles | | |
| Comparative | 58 | C | D | D | D | B |
| Example | 59 | A | B | B | A | B |
| Example | 60 | A | A | B | A | A |
| Example | 61 | A | A | B | A | A |
| Example | 62 | A | A | B | A | A |
| Example | 63 | A | A | B | A | B |
| Comparative | 64 | D | D | D | B | A |
| Comparative | 65 | D | D | D | B | B |
| Example | 66 | A | A | A | A | A |
| Comparative | 67 | C | D | D | D | B |
| Example | 68 | A | A | B | A | A |
| Example | 69 | A | A | A | A | A |
| Example | 70 | A | A | A | A | B |
| Example | 71 | A | B | B | A | B |
| Example | 72 | A | A | B | A | A |
| Example | 73 | A | A | B | A | A |
| Example | 74 | A | A | B | A | A |
| Comparative | 75 | B | C | D | B | B |
| Example | 76 | A | A | B | A | A |
| Example | 77 | A | A | B | A | A |
| Example | 78 | A | A | A | A | A |
| Example | 79 | A | A | A | A | B |
| Example | 80 | A | B | B | A | A |
| Example | 81 | A | A | B | A | A |
| Example | 82 | A | A | A | A | A |
| Comparative | 83 | C | D | D | A | B |
| Example | 84 | A | A | B | A | A |
| Example | 85 | A | A | B | A | A |
| Example | 86 | A | A | A | A | B |
| Comparative | 87 | C | D | D | A | B |
| Comparative | 88 | C | C | D | D | C |
| Comparative | 89 | C | C | D | B | D |
| | 90 | D | D | D | D | A |
| | 91 | C | C | D | C | D |

A sample of the obtained hot-dip galvanized steel sheet was cut into 25(c) mm×15(L) mm, embedded in a resin, and polished. Subsequently, an SEM image of a cross section of the plated layer and an element mapping image EDS were prepared. Tables 1-3 and 1-4 show components and a structure of the plated layer. Herein, the area fraction of each of the structure I, structure II, Zn/Al/MgZn$_2$ ternary eutectic structure formed of the Zn phase, Al phase, and MgZn$_2$ phase (expressed as "Zn/Al/MgZn$_2$ ternary eutectic structure in Tables 1-3 and 1-4), Zn/Al binary eutectic structure, interface alloyed layer formed of the Al—Fe intermetallic compound, Mg$_2$Si phase, Si phase and other intermetallic compounds, and the thickness of the interface alloyed layer were measured from the SEM image and the element mapping image. It should be noted that the "interface alloyed layer" is not included in the area fraction constituting the plated layer. The "other intermetallic compounds" in Tables 1-3 and 1-4 are a generic term of a Fe—Zn intermetallic compound in which Fe and Zn derived from steel substrate are mutually bonded, and an intermetallic compound derived from impurities contained in the plating bath, in addition to an Al—Fe intermetallic compound in which Fe and Al derived from steel substrate are mutually bonded. The interface alloyed layer, which is a layer not containing Zn and Mg and containing the Al—Fe intermetallic compound singularly present at the interface, is differentiated from the Al—Fe intermetallic compound among the "other intermetallic compounds" which are the rest of the intermetallic compounds except for the Al—Fe intermetallic compound.

FIGS. 1 and 2 show SEM images (BSE images) of No. 20 (Example 20) in Table 1. In the plated layer, the structure I (denoted by a numeral 2 in FIG. 2), the structure II (denoted by a numeral 3 in FIG. 2), the Zn/Al/MgZn$_2$ ternary eutectic structure (denoted by a numeral 4 in FIG. 1), the Mg$_2$Si phase (denoted by a numeral 5 in FIG. 1), and the interface alloyed layer (denoted by a numeral 6 in FIG. 1) were formed. Table 2 shows exemplary numerical figures of the thickness and the lamellar space of the layered Al phase and the layered Zn phase formed in the structure I.

TABLE 2

| Example No. | Thickness (nm) of Layered Zn Phase | Thickness (nm) of Layered Al Phase | Lamellar Space (nm) |
|---|---|---|---|
| 3 | 20 | 25 | 45 |
| 7 | 80 | 90 | 170 |
| 15 | 20 | 20 | 40 |
| 16 | 75 | 89 | 164 |
| 17 | 500 | 500 | 1000 |
| 20 | 65 | 70 | 135 |
| 34 | 450 | 440 | 890 |

The area fraction of each of the constituent structures of the plated layer, namely, the structure I, structure II, Zn/Al/MgZn$_2$ ternary eutectic structure, Zn/Al binary eutectic structure, Mg$_2$Si phase, interface alloyed layer and other intermetallic compounds, was calculated by analyzing cross-sectional EDS mapping images of the plated layer taken from five different samples, the respective images taken from five visual fields in total (plated layer: 50 μm×200 μm). Further, the thickness of the interface alloyed layer present at the interface between the plated layer and the steel sheet was estimated by measuring the thickness of the Al—Fe intermetallic compound from the cross-sectional EDS mapping image. SEM was manufactured by JEOL Ltd. (JSM-700F) and a detector of EDS was also manufactured by JEOL Ltd. in which an acceleration voltage was 15 kV. An element distribution mapping of a cross-sectional plated structure was taken by EDS at about 500 to 10000-fold magnification and analyzed.

In order to differentiate the Zn/Al/MgZn$_2$ ternary eutectic structure from the Zn/Al binary eutectic structure, an Mg amount was measured every 5 μm in a range of 3 μm×3 μm in the SEM-EDS element distribution image, and the range in which the Mg amount was 2% or more was determined to be the Zn/Al/MgZn$_2$ ternary eutectic structure and the range in which the Mg amount was below 2% was determined to be the Zn/Al binary eutectic structure.

The post-coating corrosion resistance of the plated layer was evaluated by: subjecting a sample (50 mm×100 mm) of a plated steel sheet to a Zn phosphate treatment (SD5350 system: manufactured by Nippon Paint Industrial Coatings Co., Ltd.); subsequently subjecting the obtained sample to electrodeposition coating (PN110 Powernics Gray: manufactured by Nippon Paint Industrial Coatings Co., Ltd.) to form a 20-μm thick coating; baking the obtained sample at a baking temperature of 150 degrees C. for 20 minutes; subsequently making cross cuts (two cuts of 40×√2) reaching the steel substrate in the coated plated steel sheet; subjecting the coated plated steel sheet to a composite cycle corrosion test in accordance with JASO (M609-91); and, after the elapse of 120 cycles, measuring the maximum blistering width at eight positions around the cross cuts to obtain an average in terms of the maximum blistering width. The post-coating corrosion resistance of the plated layer was rated by a blistering width from the cross cut at each of 60, 90 and 150 cycles in accordance with JASO (M609-91). The post-coating corrosion resistance was rated as "A" when the blistering width was at 1 mm or less, "B" at 1 to 2 mm, and "C" at 2 to 4 mm. When red rust was generated, the post-coating corrosion resistance was rated as "D."

In the composite cycle corrosion test in accordance with JASO (M609-91), the following steps (1) to (3) were repeated as one cycle.
(1) spraying of salt water for two hours (5% NaCl, 35 degrees C.)
(2) drying for four hours (60 degrees C.)
(3) wetting for two hours (50 degrees C., humidity of 95% or more)

Powdering resistance of the plated layer was evaluated by: cutting the plated steel sheet into a test piece of 40 mm (C)×100 mm (L)×0.8 mm (t); bending the test piece by 60 degrees at 5R in a C direction (bending axis direction) in accordance with a V bending test; peeling a tape from the plated layer; measuring a peeling width at each of five points of the plated layer; and obtaining an average peeling width at the five points. Specifically, the powdering resistance was rated as "A" when no peeling occurred, as "B" at the average peeling width from 0.1 to 1 mm, as "C" at the average peeling width from 1 to 2 mm, and as "D" at the average peeling width of 2 mm or more.

Chipping resistance of the plated layer was evaluated as follows. After the plated layer was subjected to the electrodeposition coating in the same manner as for the evaluation of the post-coating corrosion resistance, intermediate coating, top coating and clear coating were applied on the electrodeposition coating to prepare a coating film such that a total film thickness was 40 μm. Using a Gravel Tester (manufactured by Suga Test Instruments Co., Ltd.), 100 g of No. 7 crushed stone was blasted against the coating film of the test piece cooled to minus 20 degrees C. at a collision angle of 90 degrees with an air pressure of 3.0 kg/cm$^2$ from a distance of 30 cm. Subsequently, a peeled part of the plated layer in the collided area was exposed using an adhesive tape, and a diameter of the peeled part was measured. Top five largest diameters were selected and an average thereof was determined as a peeling diameter of the test piece. The smaller peeling diameter means more excellent chipping resistance. Chipping resistance was evaluated as follows. When the average peeling diameter was less than 1.0 mm, chipping resistance was rated as "A." When the average peeling diameter was from 1.0 mm to less than 1.5 mm, chipping resistance was rated as "B." When the average peeling diameter was from 1.5 mm to less than 3.0 mm, chipping resistance was rated as "C." When the average peeling diameter was 3.0 mm or more, chipping resistance was rated as "D."

Seizure resistance of the plated layer was evaluated as follows. Each two primary test pieces of 80-mm width×350-mm length were cut out from the obtained coated steel sheet. A draw-bead working was applied to the two test pieces using jigs that simulate a die and a bead, such that sliding occurred over the length of 150 mm or more between a surface-treated surface of the steel sheet and the die shoulder as well as the bead portion. The radii of curvature of the shoulder and the bead portion, which were used as jigs in the test, were 2 mmR and 5 mmR respectively, a pushing pressure of the die was 60 kN/m$^2$, and a drawing rate in the draw-bead working was 2 mm/min. Further, at the time of the test, a lubricating oil (550S, manufactured by Nihon Parkerizing Co., Ltd.) was applied on to both the surfaces of the test piece at, in total, 10 mg/m$^2$.

As comparatives in Examples, plated steel sheets (Comparatives except for Comparatives No. 89 to 91 in Table 1) in which each composition fall out of the scope of the invention, or have no Si or an excessive amount of Si, a retention time is short or excessive, and a retention temperature falls out of the scope of the invention, a hot-dip galvanized steel sheet (No. 89 in Table 1), galvannealed steel sheet (No. 90 in Table 1), and an electrogalvanized steel sheet (No. 91 in Table 1) were prepared and evaluated as described above. Results are shown below.

In Comparative 1, since the Al concentration in the plated layer was short, the lamellar structure (structure I) in which the layered Zn phase and the layered Al phase were alternately arranged was not sufficiently formed, resulting in insufficient chipping resistance and corrosion resistance.

In Comparative 2, since the cooling rate of the cooling condition 2 was lower than 0.095 degrees C. per second, the interface alloyed layer grew to have a thickness exceeding 2 μm, resulting in insufficient chipping resistance. Moreover, as a result of no formation of the structure I, corrosion resistance was also insufficient.

In Comparative 5, since Si was not contained in the plated layer, Zn and Al contained in the plating bath were not inhibited from reacting with Fe element contained in the steel substrate for plating, so that a large amount of impurity elements were mixed into the plated layer. As a result, intermetallic compounds (other intermetallic compounds) containing at least one of Fe, Mn, Ti, Sn, In, Bi, Pb or B were formed at a large amount exceeding 3% in the plated layer, and the interface alloyed layer was formed thick, so that chipping resistance was insufficient. Further, the Al concentration in the plated layer was short, and the Fe—Zn intermetallic compound and the Al—Fe intermetallic compound, which were derived from impurity elements, were formed at a large amount in the plated layer to cause insufficient formation of the structure I, resulting in insufficient corrosion resistance.

In Comparative 10, since the Si concentration in the plated layer was excessive, a large amount of the Si phase, which was noble in potential, was formed in the plated layer, resulting in insufficient seizure resistance, chipping resistance and corrosion resistance.

In Comparative 11, since the Mg concentration in the plated layer was short, an effect of forming an insulating coating on the Zn corrosion product to provide a barrier coating on rust was low. As a result, corrosion resistance was insufficient.

In Comparative 18, since the cooling rate of the cooling condition 1 was lower than 10 degree C. per second, the structure I was not sufficiently formed, resulting in insufficient chipping resistance and corrosion resistance.

In Comparative 19, since the cooling rate of the cooling condition 2 was higher than 1.9 degrees C. per second, the structure I was not formed at all, resulting in insufficient chipping resistance and corrosion resistance.

In Comparative 22, since the Si concentration was insufficient in the plated layer, Zn and Al contained in the plating bath were not inhibited from reacting with Fe element in the steel substrate for plating, so that a large amount of impurity elements were mixed into the plated layer. As a result, other intermetallic compounds was formed at a large amount exceeding 3% in the plated layer and the interface alloyed layer was formed thick, resulting in insufficient chipping resistance. Further, the Fe—Zn intermetallic compound and the Al—Fe intermetallic compound, which were derived from impurity elements, were formed at a large amount in the plated layer to cause insufficient formation of the structure I, resulting in insufficient corrosion resistance.

In Comparative 23, since the cooling rate of the cooling condition 2 was lower than 0.095 degrees C. per second, the interface alloyed layer grew to have a thickness exceeding 2 μm, and further, other intermetallic compounds were formed at an amount exceeding 3%, resulting in insufficient chipping resistance. Moreover, as a result of no formation of the structure I, corrosion resistance was insufficient.

In Comparative 31, since the cooling rate of the cooling condition 2 was lower than 0.095 degrees C. per second, the interface alloyed layer grew to have a thickness exceeding 2 μm, and further, other intermetallic compounds were formed at an amount exceeding 3%, resulting in insufficient chipping resistance. Moreover, as a result of no formation of the structure I, corrosion resistance was insufficient.

In Comparative 32, since the Al concentration in the plated layer was excessive, the structure I was not formed, resulting in insufficient corrosion resistance.

In Comparative 37, since the Mg concentration in the plated layer was short, the effect of forming an insulting coating on the Zn corrosion product and forming a barrier coating on rust was low. As a result, corrosion resistance was insufficient.

In Comparative 40, since the Si concentration was insufficient in the plated layer, Zn and Al contained in the plating bath was not inhibited from reacting with Fe element in the steel substrate for plating, so that a large amount of impurity elements were mixed into the plated layer. As a result, other intermetallic compounds was formed at a large amount exceeding 3% in the plated layer and the interface alloyed layer was formed thick, resulting in insufficient chipping resistance. Further, the Fe—Zn intermetallic compound and the Al—Fe intermetallic compound, which were derived from impurity elements, were formed at a large amount in the plated layer to cause insufficient formation of the structure I, resulting in insufficient corrosion resistance.

In Comparative 43, since the cooling rate of the cooling condition 2 was higher than 1.9 degrees C. per second, the structure I was not formed, resulting in insufficient chipping resistance and corrosion resistance.

In Comparative 44, since the cooling rate under the cooling condition 1 was lower than 10 degree C. per second, the structure I was not formed, resulting in insufficient chipping resistance and corrosion resistance.

In Comparative 45, since Mg was not contained in the plated layer, the effect of forming an insulting coating on the Zn corrosion product and forming a barrier coating on rust was low. As a result, corrosion resistance was insufficient.

In Comparative 48, since the cooling rate under the cooling condition 2 was lower than 0.095 degrees C. per second, the interface alloyed layer grew to have a thickness exceeding 2 μm, resulting in insufficient chipping resistance. Moreover, as a result of no formation of the structure I, corrosion resistance was insufficient.

In Comparative 50, since the Mg concentration in the plated layer was excessive, the structure I was not sufficiently formed, resulting in insufficient chipping resistance and corrosion resistance.

In Comparative 55, since the Al concentration in the plated layer was excessive, the structure I was not formed, resulting in insufficient corrosion resistance.

In Comparative 56, since the Al concentration in the plated layer was short, the structure I was not formed, resulting in insufficient chipping resistance and corrosion resistance.

In Comparative 58, since Si was not contained in the plated layer, Zn and Al contained in the plating bath were not inhibited from reacting with Fe element contained in the steel substrate for plating, so that a large amount of impurity elements were mixed into the plated layer. As a result, other intermetallic compounds was formed at a large amount exceeding 3% in the plated layer and the interface alloyed layer was formed thick, resulting in insufficient chipping resistance. Further, the Fe—Zn intermetallic compound and the Al—Fe intermetallic compound, which were derived from impurity elements, were formed at a large amount to cause insufficient formation of the structure I, resulting in insufficient corrosion resistance.

In Comparative 64, since the cooling rate of the cooling condition 2 was higher than 1.9 degrees C. per second, the structure I was not formed, resulting in insufficient chipping resistance and corrosion resistance.

In Comparative 65, since the cooling rate under the cooling condition 2 was lower than 0.095 degrees C. per second, the interface alloyed layer grew to have a thickness exceeding 2 μm, resulting in insufficient chipping resistance. Moreover, as a result of no formation of the structure I, corrosion resistance was insufficient.

In Comparative 67, since the Si concentration was insufficient in the plated layer, Zn and Al contained in the plating bath was not inhibited from reacting with Fe element in the steel substrate for plating, so that a large amount of impurity elements were mixed into the plated layer. As a result, other intermetallic compounds was formed at a large amount exceeding 3% in the plated layer and the interface alloyed layer was formed thick, resulting in insufficient chipping resistance. Further, the Fe—Zn intermetallic compound and the Al—Fe intermetallic compound, which were derived from impurity elements, were formed at a large amount to cause insufficient formation of the structure I, resulting in insufficient corrosion resistance.

In Comparative 75, since a large amount of impurities was contained in the plating bath, the total abundance ratio of other intermetallic compounds contained as inevitable impurities in the plated layer was at the area fraction exceeding 3%, corrosion resistance and chipping resistance were insufficient.

In Comparative 83, since the Al concentration in the plated layer was excessive, the structure I was not formed, resulting in insufficient corrosion resistance.

In Comparative 87, since the Al concentration in the plated layer was excessive, the structure I was not formed, resulting in insufficient corrosion resistance.

In Comparative 88, since the Si concentration in the plated layer was excessive, a large amount of the Si phase, which was noble in potential, was formed in the plated layer, resulting in insufficient corrosion resistance, chipping resistance and seizure resistance.

In Comparatives 89 to 91, since the plated layer did not contain Al, Mg and Si unlike the invention but was a simple zinc plated layer, corrosion resistance and chipping resistance were insufficient. Further, Comparatives 89 and 91 were insufficient in seizure resistance.

In contrast, the inventive Examples 3, 4, 6 to 9, 12 to 17, 20, 21, 24 to 30, 33 to 36, 38, 39, 41, 42, 46, 47, 49, 51 to 54, 57, 59 to 63, 66, 68 to 74, 76 to 82, and 84 to 86 exhibited favorable corrosion resistance, chipping resistance, and seizure resistance.

The invention claimed is:

1. A hot-dip galvanized steel sheet comprising: a plated layer formed on at least a part of a surface of a steel sheet, the plated layer comprising:
    Al in a range from 10 mass % to 40 mass %;
    Si in a range from 0.05 mass % to 4 mass %;
    Mg in a range from 0.5 mass % to 4 mass %; and
    the balance consisting of Zn and inevitable impurities, wherein the plated layer comprises structure I, structure II, a Zn/Al/MgZn$_2$ ternary eutectic structure, a Zn/Al binary eutectic structure, an Mg$_2$Si phase, an interface alloyed layer, and other intermetallic compounds, the structure I is a lamellar structure that comprises a layered Zn phase and a layered Al phase alternately arranged and accounts for 5% or more by an area fraction in a cross section of the plated layer, the structure II comprises a granular Zn phase and a granular Al phase to cover the structure I, the interface alloyed layer is formed at an interface between the plated layer and the steel sheet, the other intermetallic compounds comprise at least one of Fe, Mn, Ti, Sn, In, Bi, Pb or B, and account for 3% or less by area fraction in the cross section of the plated layer, wherein said area fraction is calculated by analyzing cross-sectional EDS mapping images of the plated layer taken from five or more different samples, wherein said images are taken from five visual fields in total, and an arithmetic mean value is obtained by calculating the area fraction in the cross section of the plated layer for said five or more different samples, which are selected randomly, and wherein the samples of said plated layer measure 50 μm by 200 μm; and a direction of the cross section of the plated layer is a thickness direction of the plated layer.

2. The hot-dip galvanized steel sheet according to claim 1, wherein
the plated layer comprises Al in a range from 10 mass % to 30 mass %, Si in a range from 0.05 mass % to 2.5 mass %, and Mg in a range from 2 mass % to 4 mass %.

3. The hot-dip galvanized steel sheet according to claim 1, wherein
the plated layer comprises the structure I at the area fraction in a range from 20% to 80%.

4. The hot-dip galvanized steel sheet according to claim 3, wherein
the plated layer comprises the structure I at the area fraction in a range from 40% to 50%.

5. The hot-dip galvanized steel sheet according to claim 1, wherein
the plated layer comprises the Zn/Al/MgZn$_2$ ternary eutectic structure comprising a Zn phase, an Al phase and an MgZn$_2$ phase at the area fraction in a range from 20% to 90%.

6. The hot-dip galvanized steel sheet according to claim 1, wherein
the interface alloyed layer consists of an Al—Fe intermetallic compound and has a thickness in a range from 100 nm to 2 μm, and is formed at an interface between the plated layer and the steel sheet, wherein the thickness of the interface alloyed layer present at said interface between the plated layer and the steel sheet is determined by measuring a thickness of the Al—Fe intermetallic compound from said cross-sectional EDS mapping images.

7. The hot-dip galvanized steel sheet according to claim 1, wherein each of the layered Zn phase and the layered Al phase in the structure I is in a form of a layer having an aspect ratio of 0.1 or less, wherein said aspect ratio is defined as a ratio of a short side to a long side of a crystal grain size.

* * * * *